(12) United States Patent
Pak et al.

(10) Patent No.: US 10,754,461 B2
(45) Date of Patent: Aug. 25, 2020

(54) DISPLAY DEVICE WITH INTEGRATED TOUCH SCREEN

(71) Applicant: LG Display Co., Ltd., Seoul (KR)

(72) Inventors: SangHoon Pak, Seoul (KR); MinJoo Kim, Seoul (KR); Jeonghoon Lee, Gimpo-si (KR); Yuna Lee, Suwon-si (KR)

(73) Assignee: LG DISPLAY CO., LTD., Seoul (KR)

( * ) Notice: Subject to any disclaimer, the term of this patent is extended or adjusted under 35 U.S.C. 154(b) by 154 days.

(21) Appl. No.: 15/992,630

(22) Filed: May 30, 2018

(65) Prior Publication Data

US 2018/0348937 A1 Dec. 6, 2018

(30) Foreign Application Priority Data

May 31, 2017 (KR) ........................ 10-2017-0067889

(51) Int. Cl.
*G06F 3/041* (2006.01)

(52) U.S. Cl.
CPC .. *G06F 3/0412* (2013.01); *G06F 2203/04103* (2013.01); *G06F 2203/04111* (2013.01)

(58) Field of Classification Search
CPC ......... G06F 3/0412; G06F 2203/04103; G06F 3/041; G06F 3/044
See application file for complete search history.

(56) References Cited

U.S. PATENT DOCUMENTS

| | | | |
|---|---|---|---|
| 2010/0026661 A1* | 2/2010 | Teramoto | G06F 3/044 345/174 |
| 2010/0171718 A1* | 7/2010 | Denda | G06F 3/044 345/173 |
| 2011/0291977 A1* | 12/2011 | Moriwaki | G02F 1/136286 345/173 |
| 2013/0241857 A1* | 9/2013 | Chung | G06F 3/044 345/173 |
| 2014/0042398 A1 | 2/2014 | Choi et al. | |
| 2014/0118277 A1* | 5/2014 | Kim | G06F 3/044 345/173 |
| 2014/0152921 A1* | 6/2014 | Yashiro | G06F 1/1692 349/12 |
| 2015/0049030 A1* | 2/2015 | Her | G06F 3/0412 345/173 |
| 2015/0049260 A1* | 2/2015 | Yashiro | G06F 3/044 349/12 |
| 2015/0309634 A1* | 10/2015 | Lee | G06F 3/0412 345/173 |

(Continued)

*Primary Examiner* — Benyam Ketema
(74) *Attorney, Agent, or Firm* — Seed IP Law Group LLP

(57) ABSTRACT

Disclosed is a display device with integrated touch screen, which can prevent a first touch electrode or a second touch electrode from being short-circuited with a bridge electrode through an opening. The display device includes first electrodes on a first substrate, a light emitting layer on the first electrodes, a second electrode on the light emitting layer, an encapsulation layer on the second electrode, a bridge electrode and a dummy electrode on the encapsulation layer, an insulation layer covering the bridge electrode and the dummy electrode, and a first touch electrode and a second touch electrode on the insulation layer. The first touch electrode is electrically connected to the bridge electrode, and bridge electrode is spaced apart from the dummy electrode.

30 Claims, 17 Drawing Sheets

(56) References Cited

U.S. PATENT DOCUMENTS

2016/0132148 A1* 5/2016 Han ................. G06F 3/044
 345/174
2016/0327834 A1* 11/2016 Yu ................. G02F 1/134363
2018/0181240 A1* 6/2018 Heo ................. H01L 51/5284

* cited by examiner

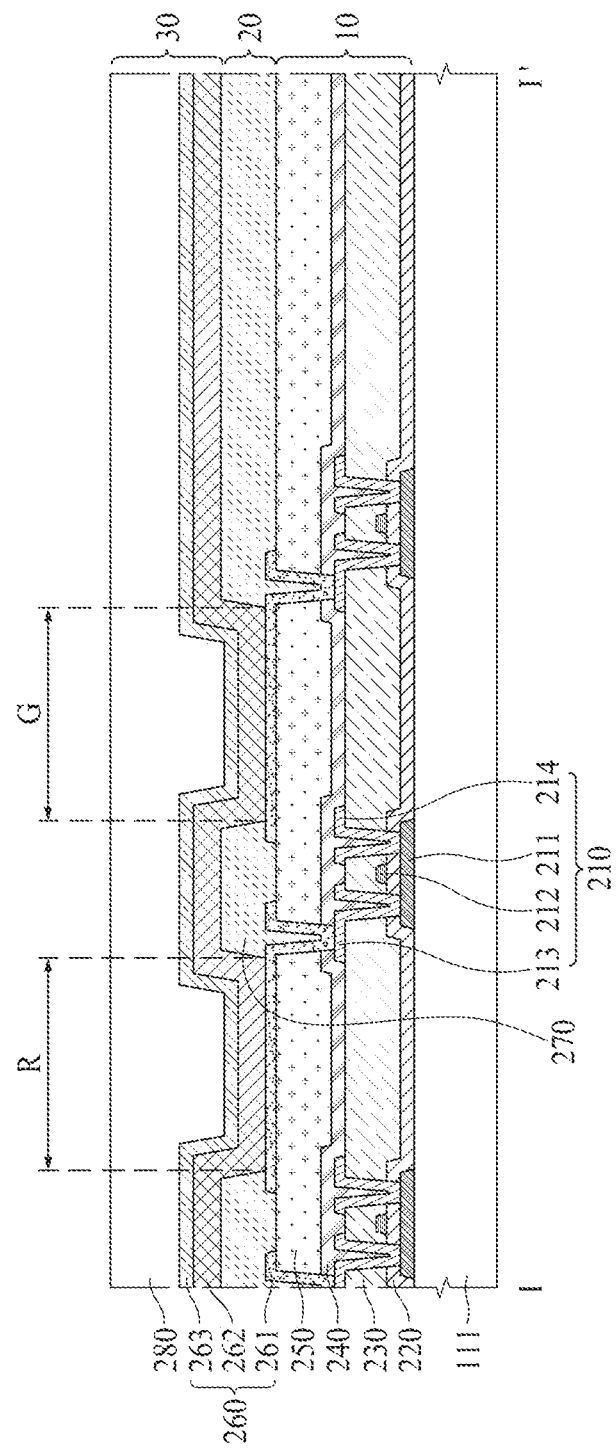

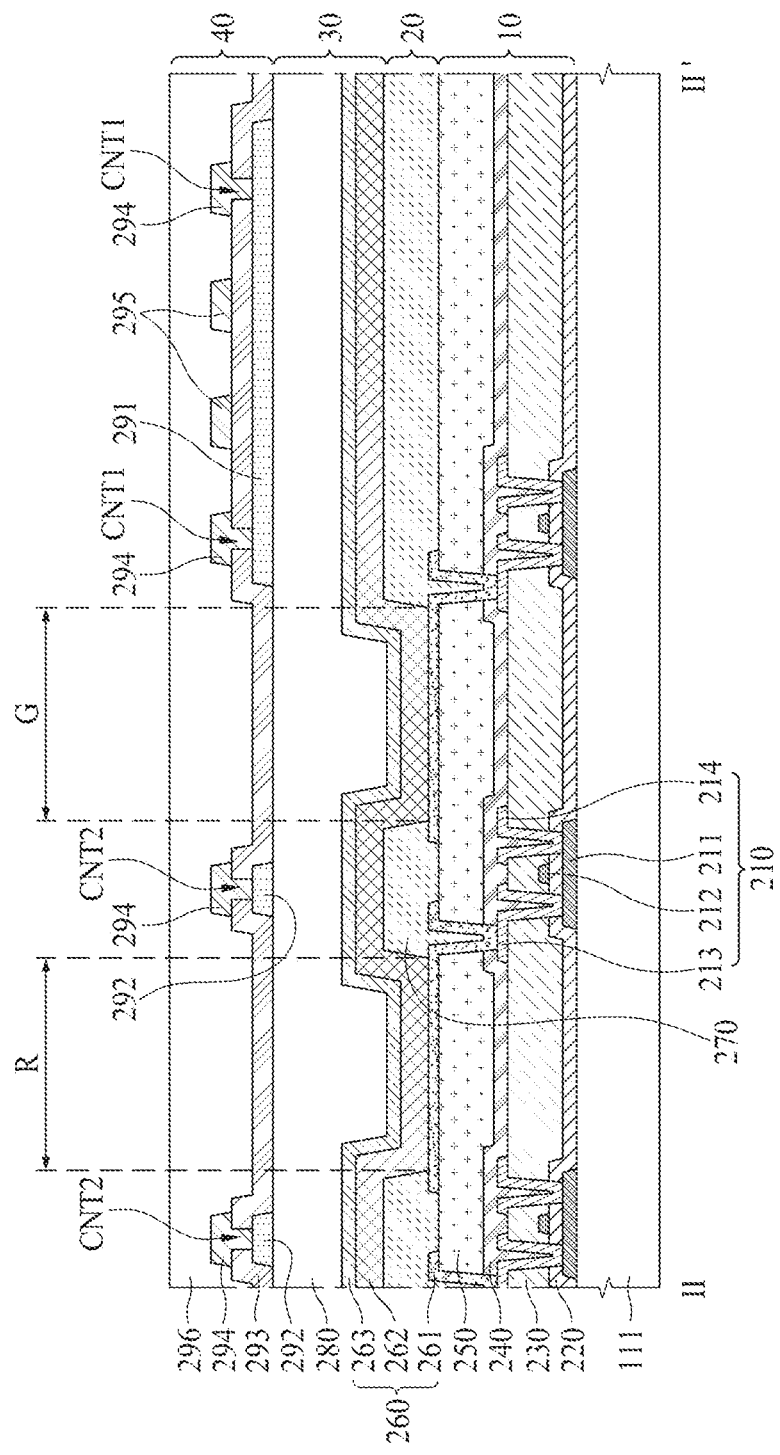

DISPLAY DEVICE WITH INTEGRATED TOUCH SCREEN

CROSS-REFERENCE TO RELATED APPLICATIONS

This application claims the benefit of the Korean Patent Application No. 10-2017-0067889, filed May 31, 2017, which is hereby incorporated by reference as if fully set forth herein.

BACKGROUND

Technical Field

The present disclosure relates to a display device with integrated touch screen and a method of manufacturing the same.

Description of the Related Art

With the advancement of information-oriented society, various requirements for display devices for displaying an image are increasing. Consequently, various display devices such as liquid crystal display (LCD) devices, plasma display panel (PDP) devices, and organic light emitting display devices are being used recently. The organic light emitting display devices have characteristics where driving is performed with a low voltage, a thickness is thin, a viewing angle is good, and a response time is fast.

The organic light emitting display devices each include a display panel which includes a plurality of data lines, a plurality of scan lines, and a plurality of pixels respectively provided in a plurality of pixel areas defined by intersections of the data lines and the scan lines, a scan driver which respectively supplies scan signals to the scan lines, and a data driver which respectively supplies data voltages to the data lines. Each of the pixels includes an organic light emitting device, a driving transistor which controls the amount of current supplied to the organic light emitting device according to a voltage of a gate electrode, and a scan transistor which supplies a data voltage of a corresponding data line to the gate electrode of the driving transistor in response to a scan signal of a corresponding scan line.

Recently, the organic light emitting display devices are implemented as display devices with integrated touch screen, which includes a touch screen panel capable of sensing a user touch. In this case, the organic light emitting display devices function as touch screen devices. Recently, the touch screen devices are applied to monitors such as navigations, industrial terminals, notebook computers, financial automation equipment, and game machines, portable terminals such as portable phones, MP3 players, personal digital assistants (PDAs), portable multimedia players (PMPs), play station portables (PSPs), portable game machines, digital multimedia broadcasting (DMB) receivers, and tablet personal computers (PCs), and home appliances such as refrigerators, microwave ovens, and washing machines. Since all users can easily manipulate the touch screen devices, the application of the touch screen devices is being progressively expanded.

Display devices with integrated touch screen include a plurality of first touch electrodes, a plurality of second touch electrodes, and a plurality of bridge electrodes for connecting the first touch electrodes to the second touch electrodes, which are provided in a display panel. The first touch electrodes may be Tx electrodes, and the second touch electrodes may be Rx electrodes.

The first touch electrodes and the second touch electrodes may be provided on the same layer, and the bridge electrodes may be provided on a layer which differs from a layer on which the first touch electrodes and the second touch electrodes are provided. Each of the bridge electrodes is provided in an island shape, but since the bridge electrodes are spaced apart from each other by a certain interval, the bridge electrodes can be over-etched in an etching process of patterning the bridge electrodes.

In detail, as shown in FIG. 1, a plurality of bridge electrodes BE may be provided in a three-layer structure including first to third bridge electrodes BE1 to BE3. For example, the first to third bridge electrodes BE1 to BE3 may be provided in a three-layer structure of titanium (Ti)/aluminum (Al)/Ti. If Al is higher than Ti in degree of etching which is performed by an etching gas or an etchant in an etching process, Al can be over-etched in comparison with Ti, and an over-etching region of Al can be provided in a reverse taper shape. Particularly, a side surface of the second bridge electrode BE2 can be easily etched as in FIG. 1. Therefore, even when an insulation layer INS is provided on the bridge electrodes BE, an opening OP may be provided in the over-etching region as in FIG. 1. Therefore, even when a plurality of first touch electrodes or a plurality of second touch electrodes are provided on the insulation layer INS, a first touch electrode or a second touch electrode is short-circuited with a bridge electrode BE through the opening OP, which exposes portions of the second bridge electrode BE2. In this case, the first touch electrode is connected to the bridge electrode BE, but if the second touch electrode is short-circuited with the bridge electrode BE through the opening OP, a display device with integrated touch screen is difficult to normally sense a touch.

BRIEF SUMMARY

Accordingly, the present disclosure is directed to provide a display device with integrated touch screen that substantially obviates one or more problems due to limitations and disadvantages of the related art.

In one or more embodiments, the present disclosure provides a display device with integrated touch screen, which prevents a first touch electrode or a second touch electrode from being short-circuited with a bridge electrode through an opening.

Additional advantages and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these and other advantages and in accordance with the purpose of the disclosure, as embodied and broadly described herein, in one embodiment a display device with integrated touch screen is provided, the display device including first electrodes on a first substrate, a light emitting layer on the first electrodes, a second electrode on the light emitting layer, an encapsulation layer on the second electrode, a bridge electrode and a dummy electrode on the encapsulation layer, an insulation layer covering the bridge electrode and the dummy electrode, and a first touch electrode and a second touch electrode on the insulation layer.

The bridge electrode is electrically connected to the first touch electrode, and is spaced apart from the dummy electrode.

In another embodiment, the present disclosure provides a display device with integrated touch screen, the display device comprising: first electrodes on a first substrate; a light emitting layer on the first electrode; a second electrode on the light emitting layer; an encapsulation layer on the second electrode; a touch buffer layer on the encapsulation layer; a bridge electrode having a multi-layer structure and a dummy electrode on the touch buffer layer; an insulation layer covering the bridge electrode and the dummy electrode; and a first touch electrode and a second touch electrode on the insulation layer, wherein the bridge electrode is electrically connected with the first touch electrode, the bridge electrode is disposed adjacent to the dummy electrode, and a side surface of the bridge electrode is provided in a positive taper shape.

In another embodiment of the present disclosure, there is provided a method of manufacturing a display device with integrated touch screen, the method including forming a first electrode on a first substrate, forming a light emitting layer on the first electrode, forming a second electrode on the light emitting layer, forming an encapsulation layer on the second electrode, forming a bridge electrode and a dummy electrode on the encapsulation layer, the bridge electrode being spaced apart from the dummy electrode, forming an insulation layer covering the bridge electrode and the dummy electrode, and forming a first touch electrode and a second touch electrode on the insulation layer.

In one or more embodiments, the forming of the insulation layer may comprise forming a first contact hole, which passes through the insulation layer and exposes the bridge electrode, and a second contact hole exposing the dummy electrode.

In one or more embodiments, the forming of the first touch electrode and the second touch electrode may comprise: forming the first touch electrode on the first contact hole so that the first touch electrode is connected to the bridge electrode through the first contact hole; and forming the first touch electrode or the second touch electrode on the second contact hole so that the first touch electrode or the second touch electrode is connected to the dummy electrode through the second contact hole.

In one or more embodiments, the method may further comprise forming an overcoat layer on the first and second touch electrodes for planarizing a step height caused by the bridge electrode, the dummy electrode, and the first and second touch electrodes.

In one or more embodiments, the forming of the insulation layer may comprise forming a contact hole, which passes through the insulation layer and exposes the bridge electrode, wherein the forming of the first touch electrode and the second touch electrode may comprise forming the first or second touch electrode on the contact hole so that the first or second touch electrode is connected to the bridge electrode through the contact hole.

In one or more embodiments, the forming of the bridge electrode and the dummy electrode may comprise forming the bridge electrode and the dummy electrode of a same material on a same layer.

In another aspect of the present disclosure, there is provided a method of manufacturing a display device with integrated touch screen, the method comprising: forming first electrodes on a first substrate, forming a light emitting layer on the first electrodes, and forming a second electrode on the light emitting layer; forming an encapsulation layer on the second electrode; forming a touch buffer layer on the encapsulation layer; forming a bridge electrode having a multi-layer structure and a dummy electrode on the touch buffer layer; forming an insulation layer covering the bridge electrode and the dummy electrode; and forming a first touch electrode and a second touch electrode on the insulation layer, wherein the forming of the bridge electrode and the dummy electrode comprises forming the bridge electrode to be electrically connected with the first or second touch electrode, forming the bridge electrode to be disposed adjacent to the dummy electrode, and forming a side of the bridge electrode to be a positive taper shape.

In one or more embodiments, the forming of the bridge electrode and the dummy electrode may comprise forming the dummy electrode as a floating electrode.

In one or more embodiments, the forming of the bridge electrode and the dummy electrode may comprise forming the bridge electrode and the dummy electrode of a same material on a same layer.

It is to be understood that both the foregoing general description and the following detailed description of the present disclosure are exemplary and explanatory and are intended to provide further explanation of the disclosure as claimed.

BRIEF DESCRIPTION OF THE SEVERAL VIEWS OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings:

FIGS. 10A to 10D are cross-sectional views for describing a method of manufacturing a display device with integrated touch screen according to an embodiment of the present disclosure;

FIGS. 14A and 14B are cross-sectional views for describing a method of manufacturing a display device with integrated touch screen according to another embodiment of the present disclosure.

DETAILED DESCRIPTION

Figure 1:
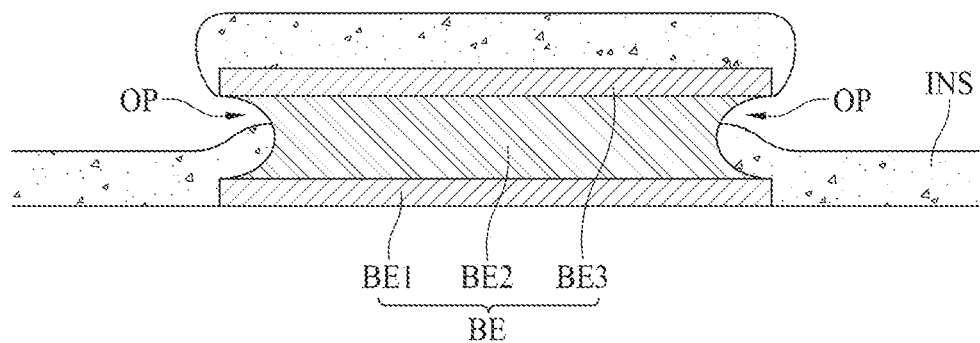
FIG. 1 is an exemplary diagram illustrating an example where an opening is provided when a bridge electrode having a three-layer structure is over-etched.

Reference will now be made in detail to the exemplary embodiments of the present disclosure, examples of which are illustrated in the accompanying drawings. Wherever possible, the same reference numbers will be used throughout the drawings to refer to the same or like parts.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted.

In a case where 'comprise,' 'have,' and 'include' described in the present specification are used, another part may be added unless 'only~' is used. The terms of a singular form may include plural forms unless referred to the contrary.

In construing an element, the element is construed as including an error range although there is no explicit description.

In describing a position relationship, for example, when a position relation between two parts is described as 'on~,' 'over~,' 'under~,' and 'next~,' one or more other parts may be disposed between the two parts unless exclusively limited by terms such as 'just' or 'direct'.

In describing a time relationship, for example, when the temporal order is described as 'after~,' 'subsequent~,' 'next~,' and 'before~,' a case which is not continuous may be included unless 'just' or 'direct' is used.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

An X axis direction, a Y axis direction, and a Z axis direction should not be construed as only a geometric relationship where a relationship therebetween is strictly vertical, and may denote having a broader directionality within a scope where elements of the present disclosure operate functionally.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

Hereinafter, exemplary embodiments of the present disclosure will be described in detail with reference to the accompanying drawings.

Figure 2:
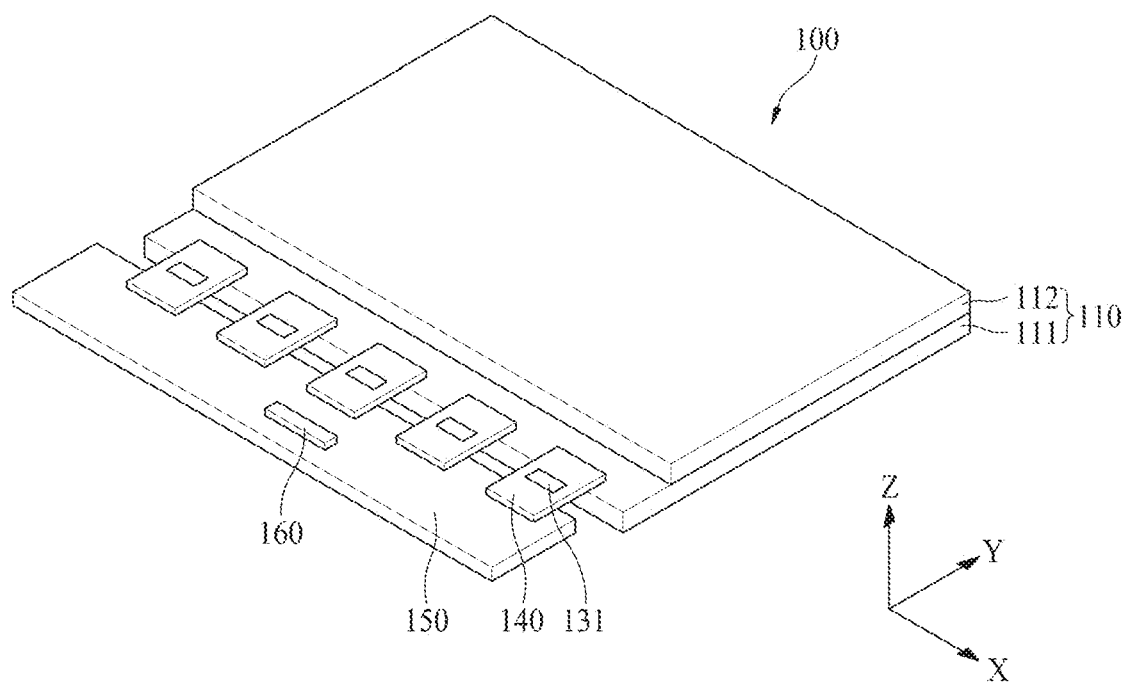
FIG. 2 is a perspective view illustrating a display device with integrated touch screen according to an embodiment of the present disclosure.
Figure 3:
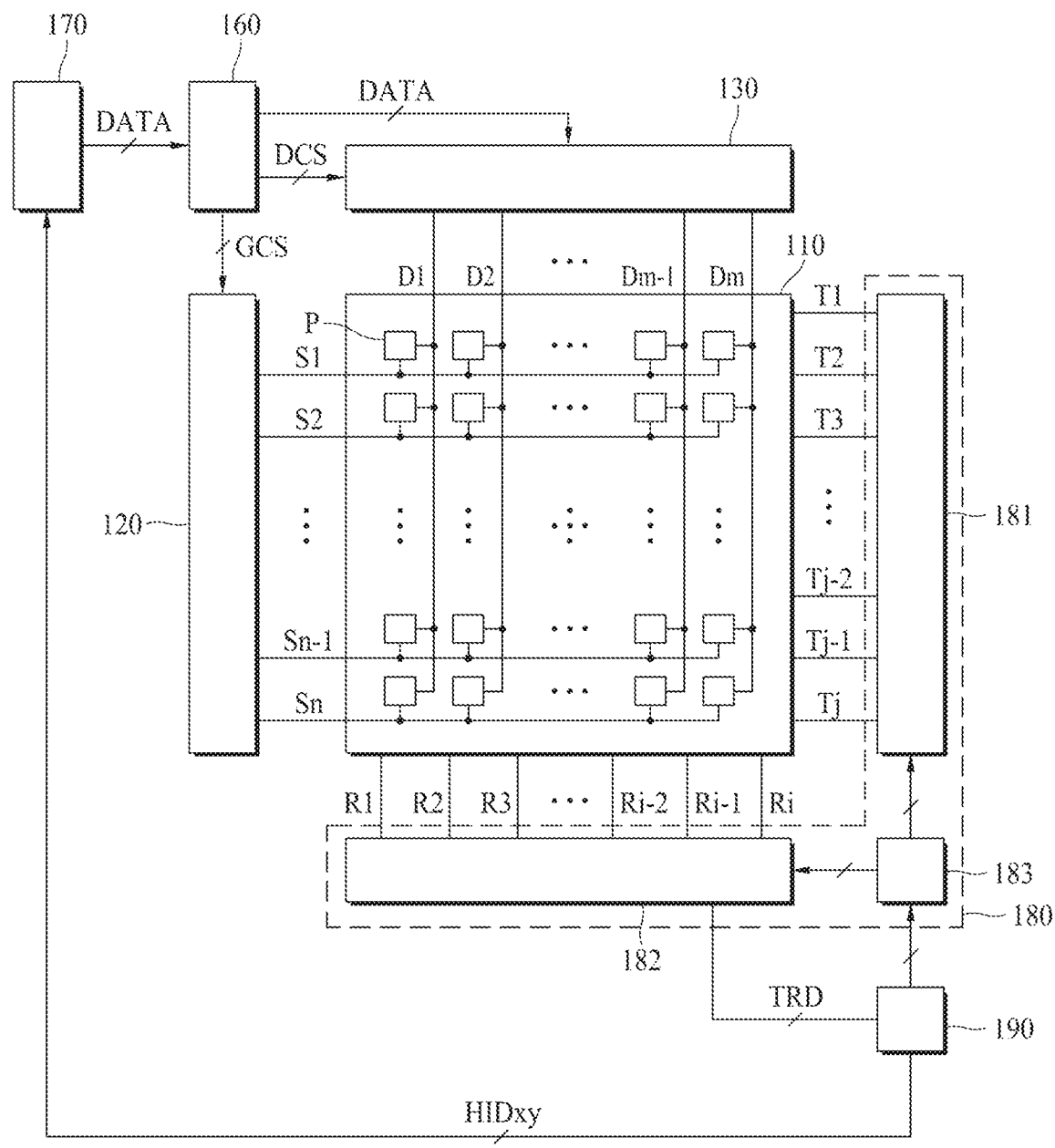
FIG. 3 is a block diagram illustrating a display device with integrated touch screen according to an embodiment of the present disclosure.

FIG. 2 is a perspective view illustrating a display device with integrated touch screen according to an embodiment of the present disclosure. FIG. 3 is a block diagram illustrating a display device with integrated touch screen according to an embodiment of the present disclosure.

Referring to FIGS. 2 and 3, the display device with integrated touch screen 100 according to an embodiment of the present disclosure may include a display panel 110, a scan driver 120, a data driver 130, a timing controller 160, a host system 170, a touch driver 180, and a touch coordinate calculator 190.

The display device with integrated touch screen according to an embodiment of the present disclosure may be implemented with an LCD device, a field emission display (FED) device, a PDP device, a light emitting display device including an organic light emitting display device (OLED) and a micro LED (light emitting device) display device, an electrophoresis display (EPD) device, or the like. Hereinafter, an example where the display device with integrated touch screen according to an embodiment of the present disclosure is implemented with an organic light emitting display device will be described, but the present disclosure is not limited thereto.

The display panel 110 may include a first substrate 111 and a second substrate 112. The second substrate 112 may be an encapsulation substrate. The first substrate 111 may be a plastic film, a glass substrate, or the like. The second substrate 112 may be a plastic film, a glass substrate, an encapsulation film (a protective film), or the like.

The display panel 110 may include a display area where a plurality of pixels P are provided to display an image. A plurality of data lines D1 to Dm (where m is a positive integer equal to or more than two) and a plurality of scan lines S1 to Sn (where n is a positive integer equal to or more than two) may be provided. The data lines D1 to Dm may be provided to intersect the scan lines S1 to Sn. The term "intersect" is used herein to mean that one element crosses over or overlaps another element, and does not necessarily mean that the two elements contact each other. For example, the data lines D1 to Dm and the scan lines S1 to Sn may intersect each other, but may be physically separated from one another, for example, by one or more layers or elements provided therebetween. The pixels P may be respectively provided in a plurality of areas defined by an intersection structure of the data lines D1 to Dm and the scan lines S1 to Sn.

Each of the pixels P of the display panel 110 may be connected to one of the data lines D1 to Dm and one of the scan lines S1 to Sn. Each of the pixels P of the display panel 110 may include a driving transistor which controls a drain-source current according to a data voltage applied to a gate electrode, a scan transistor which is turned on by a scan signal of a scan line and supplies the data voltage of a data line to the gate electrode of the driving transistor, a light emitting device such as an organic light emitting diode (OLED) which emits light with the drain-source current of the driving transistor, and a capacitor which stores a voltage at the gate electrode of the driving transistor. Therefore, each of the pixels P may emit light with a current supplied to the OLED.

The scan driver 120 may receive a scan control signal GCS from the timing controller 160. The scan driver 120 may supply scan signals to the scan lines S1 to Sn according to the scan control signal GCS.

The scan driver 120 may be provided in a non-display area outside one side or both sides of a display area of the display panel 110 in a gate driver-in panel (GIP) type. Alternatively, the scan driver 120 may be manufactured as a driving chip and may be mounted on a flexible film, and moreover, may be attached on the non-display area outside the one side or the both sides of the display area of the display panel 110 in a tape automated bonding (TAB) type.

The data driver 130 may receive digital video data DATA and a data control signal DCS from the timing controller 160. The data driver 130 may convert the digital video data DATA into analog positive/negative data voltages according to the data control signal DCS and may supply the data voltages to the data lines. That is, pixels to which the data voltages are to be supplied may be selected by the scan signals of the scan driver 120, and the data voltages may be supplied to the selected pixels.

The data driver 130, as in FIG. 2, may include a plurality of source drive integrated circuits (ICs) 131. Each of the plurality of source drive ICs 131 may be mounted on a flexible film 140 in a chip-on film (COF) type or a chip-on plastic (COP) type. The flexible film 140 may be attached on a plurality of pads provided in the non-display area of the display panel 110 by using an anisotropic conductive film, and thus, the plurality of source drive ICs 131 may be connected to the pads.

The flexible film 140 may be provided in plurality, and a circuit board 150 may be attached on the flexible films 140. A plurality of circuits respectively implemented as driving chips may be mounted on the circuit board 150. For example, the timing controller 160 may be mounted on the circuit board 150. The circuit board 150 may be a printed circuit board (PCB) or a flexible printed circuit board (FPCB).

The timing controller 160 may receive the digital video data DATA and timing signals from the host system 170. The timing signals may include a vertical synchronization signal, a horizontal synchronization signal, a data enable signal, a dot clock, etc. The vertical synchronization signal may be a signal that defines one frame period. The horizontal synchronization signal may be a signal that defines one horizontal period necessary for supplying data voltages to pixels of one horizontal line of the display panel 110. The data enable signal may be a signal that defines a period where valid data is input. The dot clock may be a signal that is repeated at a certain short period.

The timing controller 160 may generate the data control signal DCS for controlling an operation timing of the data driver 130 and the scan control signal GCS for controlling an operation timing of the scan driver 120 so as to control the operation timing of each of the scan driver 120 and the data driver 130, based on the timing signals. The timing controller 160 may output the scan control signal GCS to the scan driver 120 and may output the digital video data DATA and the data control signal DCS to the data driver 130.

The host system 170 may be implemented as a navigation system, a set-top box, a DVD player, a blue-ray player, a personal computer (PC), a home theater system, a broadcasting receiver, a phone system, or the like. The host system 170 may include a system-on chip (SoC) with a scaler embedded therein and may convert the digital video data DATA of an input image into a format suitable for displaying the image on the display panel 110. The host system 170 may transmit the digital video data DATA and the timing signals to the timing controller 160.

In addition to the data lines D1 to Dm and the scan lines S1 to Sn, a plurality of first and second touch electrodes may be provided in the display panel 110. The first touch electrodes may be provided to intersect, e.g., to overlap with, the second touch electrodes. The first touch electrodes may be connected to a first touch driver 181 through a plurality of first touch lines T1 to Tj (where j is a positive integer equal to or more than two). The second touch electrodes may be connected to a second touch driver 182 through a plurality of second touch lines R1 to Ri (where i is a positive integer equal to or more than two). A plurality of touch sensors may be respectively provided in intersection regions of the first touch electrodes and the second touch electrodes. In an embodiment of the present disclosure, each of the touch sensors may be exemplarily implemented with a mutual capacitor, but is not limited thereto. A disposition structure of the first and second touch electrodes will be described below in detail with reference to FIG. 5.

The touch driver 180 may supply a driving pulse to the first touch electrodes through the first touch lines T1 to Tj and may sense charging variations of the touch sensors through the second touch lines R1 to Ri. That is, in FIG. 3, it is described that the first touch lines T1 to Tj are Tx lines through which the driving pulse is supplied, and the second touch lines R1 to Ri are Rx lines through which the charging variations of the touch sensors are respectively sensed.

The touch driver 180 may include a first touch driver 181, a second touch driver 182, and a touch controller 183. The first touch driver 181, the second touch driver 182, and the touch controller 183 may be integrated into one readout integrated circuit or chip (ROIC).

The first touch driver 181 may select a first touch line through which the driving pulse is to be output, based on control by the touch controller 183 and may supply the driving pulse to the selected first touch line. For example, the driving pulse may be provided in plurality, and the first touch driver 181 may sequentially supply the driving pulses to the first touch lines T1 to Tj.

The second touch driver 182 may select second touch lines through which charging variations of touch sensors are to be received, based on control by the touch controller 183 and may receive the charging variations of the touch sensors through the selected second touch lines. The second touch driver 182 may sample the charging variations of the touch sensors received through the second touch lines R1 to Ri to convert the charging variations into touch raw data TRD which are digital data.

The touch controller 183 may generate a Tx setup signal for setting a first touch line, to which the driving pulse is to be output from the first touch driver 181, and an Rx setup signal for setting a second touch line through which a touch sensor voltage is to be received by the second touch driver 182. Also, the touch controller 183 may generate timing control signals for controlling the operation timings of the first touch driver 181 and the second touch driver 182.

The touch coordinate calculator 190 may receive the touch raw data TRD from the touch driver 180. The touch coordinate calculator 190 may calculate touch coordinates, based on a touch coordinate calculation method and may output touch coordinate data HIDxy, including information about the touch coordinates, to the host system 170.

The touch coordinate calculator 190 may be implemented with a micro controller unit (MCU). The host system 170 may analyze the touch coordinate data HIDxy input from the touch coordinate calculator 190 to execute an application program associated with coordinates where a touch has been performed by a user. The host system 170 may transmit the digital video data DATA and the timing signals to the timing controller 160 according to the executed application program.

The touch driver 180 may be included in the source drive ICs 131, or may be manufactured as a separate driving chip and mounted on the circuit board 150. Also, the touch coordinate calculator 190 may be manufactured as a separate driving chip and mounted on the circuit board 150.

Figure 4:
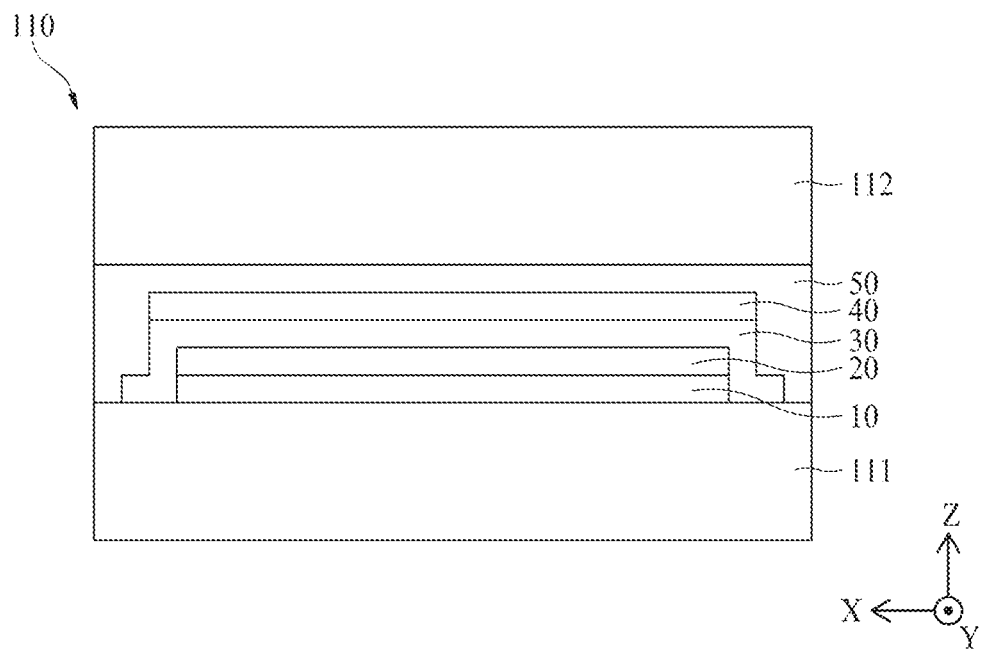
FIG. 4 is a cross-section view of one side of a display panel of FIG. 2.

FIG. 4 is a cross-section view of one side of the display panel 110 of FIG. 2.

Referring to FIG. 4, the display panel 110 may include a first substrate 111, a second substrate 112, a thin film transistor (TFT) layer 10 disposed between the first and second substrates 111 and 112, a light emitting device layer 20, an encapsulation layer 30, a touch sensing layer 40, and an adhesive layer 50.

The first substrate 111 may be a plastic film, a glass substrate, or the like.

The TFT layer 10 may be formed on the first substrate 111. The TFT layer 10 may include the scan lines, the data lines, and a plurality of TFTs. The TFTs may each include a gate electrode, a semiconductor layer, a source electrode, and a drain electrode. In a case where the scan driver is provided as the GIP type, the scan driver may be formed along with the TFT layers 10. The TFT layer 10 will be described below in detail with reference to FIGS. 8 to 12.

The light emitting device layer 20 may be formed on the TFT layer 10. The light emitting device layer 20 may include a plurality of first electrodes, a light emitting layer such as an organic light emitting layer, a second electrode, and a plurality of banks. The organic light emitting layer may include a hole transporting layer, a light emitting layer, and an electron transporting layer. In this case, when a voltage is applied to the first electrode and the second electrode, a hole and an electron move to the light emitting layer through the hole transporting layer and the electron transporting layer and are combined with each other in the light emitting layer to emit light. Pixels may be provided in an area where the light emitting device layer 20 is provided, and thus, the area where the light emitting device layer 20 is provided may be defined as a display area. A peripheral area of the display area may be defined as a non-display area. The light emitting device layer 20 will be described below in detail with reference to FIGS. 8 and 12.

The encapsulation layer 30 may be formed on the light emitting device layer 20. The encapsulation layer 30 prevents oxygen or water from penetrating into the light emitting device layer 20. The encapsulation layer 30 may include at least one inorganic layer. A cross-sectional structure of the encapsulation layer 30 will be described below in detail with reference to FIGS. 8 and 12.

The touch sensing layer 40 may be formed on the encapsulation layer 30. The touch sensing layer 40 may include first and second touch electrodes for sensing a user touch, a plurality of bridge electrodes, and a plurality of dummy electrodes. That is, in an embodiment of the present disclosure, since the touch sensing layer 40 for sensing a user touch is formed on the encapsulation layer 30, it is not required that a touch screen device is separately attached on a display device. A plane structure of the touch sensing layer 40 will be described below with reference to FIGS. 5, 6, 7A, and 7B. Also, a cross-sectional structure of the touch sensing layer 40 will be described below in detail with reference to FIGS. 8 and 12.

The adhesive layer 50 may be formed on the touch sensing layer 40. The adhesive layer 50 may attach the second substrate 112 on the first substrate 111 on which the TFT layer 10, the light emitting device layer 20, the encapsulation layer 30, and the touch sensing layer 40 are provided. The adhesive layer 50 may be an optically clear resin (OCR) layer, an optically clear adhesive (OCA) film, or the like.

The second substrate 112 may act as a cover substrate or a cover window, which covers the first substrate 111. The second substrate 112 may be a plastic film, a glass substrate, an encapsulation film (a protective film), or the like.

Figure 5:
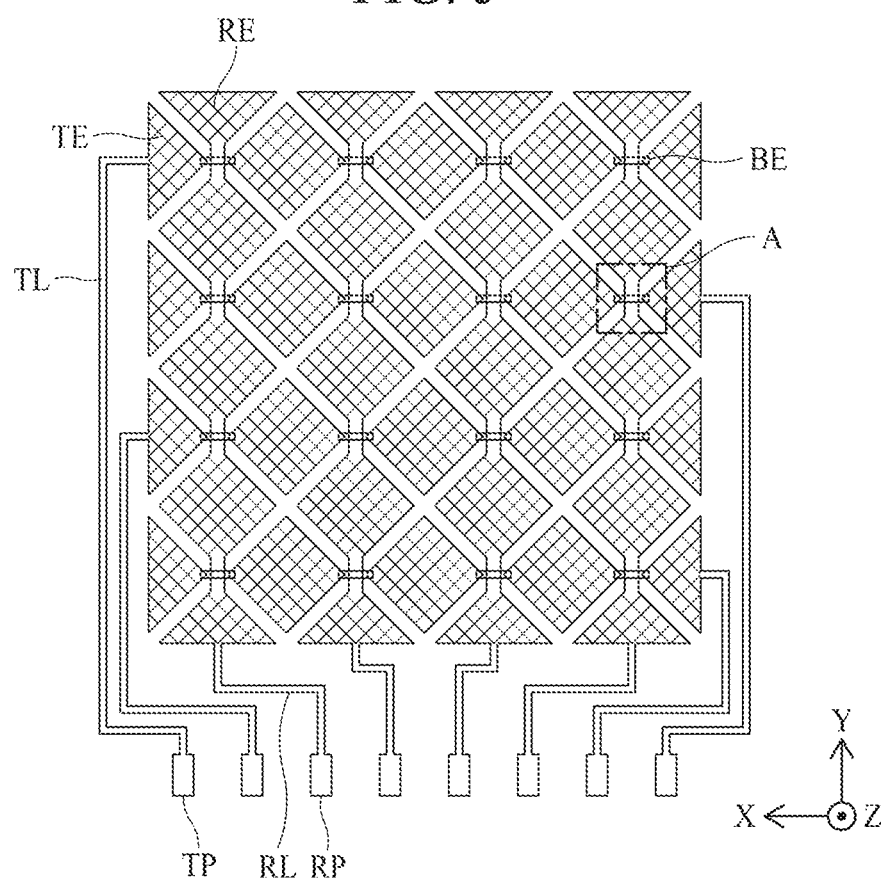
FIG. 5 is a plan view illustrating first and second touch electrodes, bridge electrodes, and first and second touch lines of a display device with integrated touch screen according to an embodiment of the present disclosure.
Figure 6:
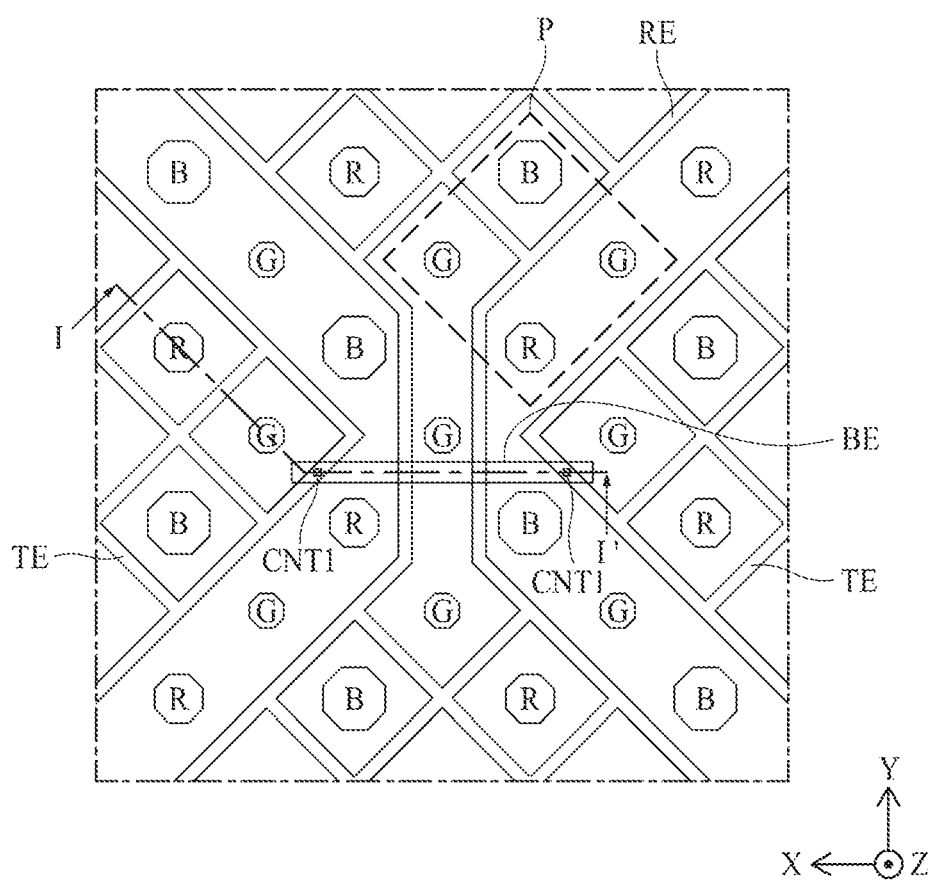
FIG. 6 is an enlarged view illustrating in detail an example of a region A of FIG. 5, in accordance with one or more embodiments of the present disclosure.
Figure 7A:
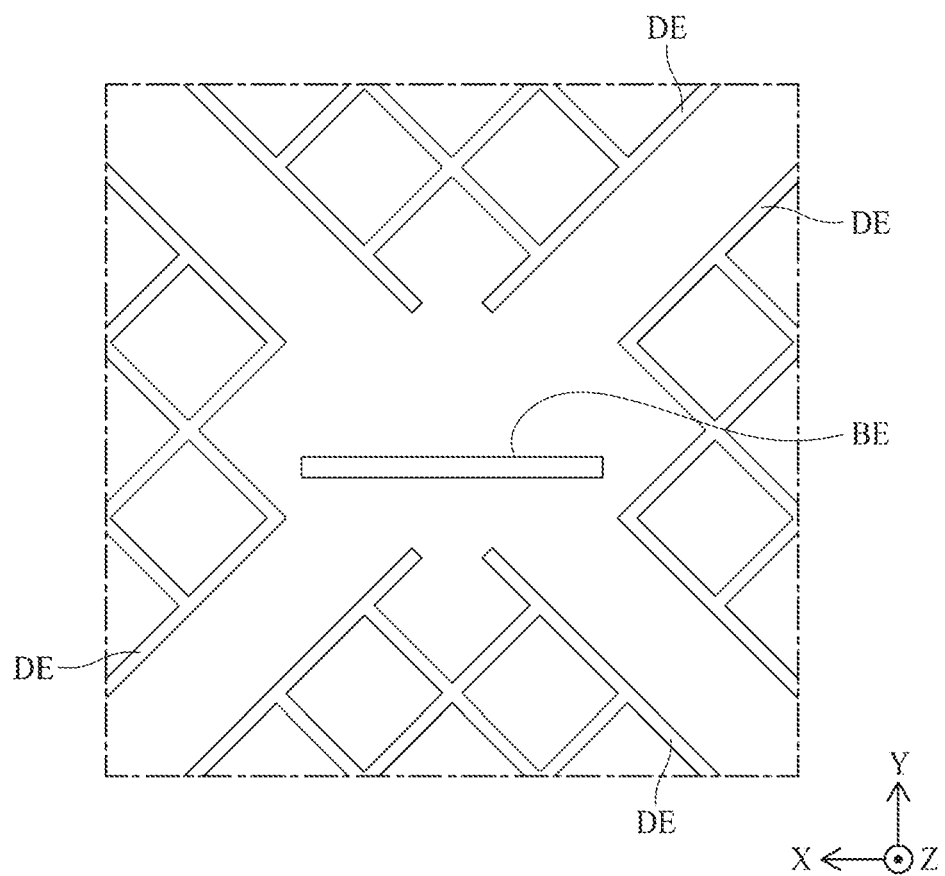
FIG. 7A is a plan view illustrating bridge electrodes and dummy electrodes in FIG. 6.
Figure 7B:
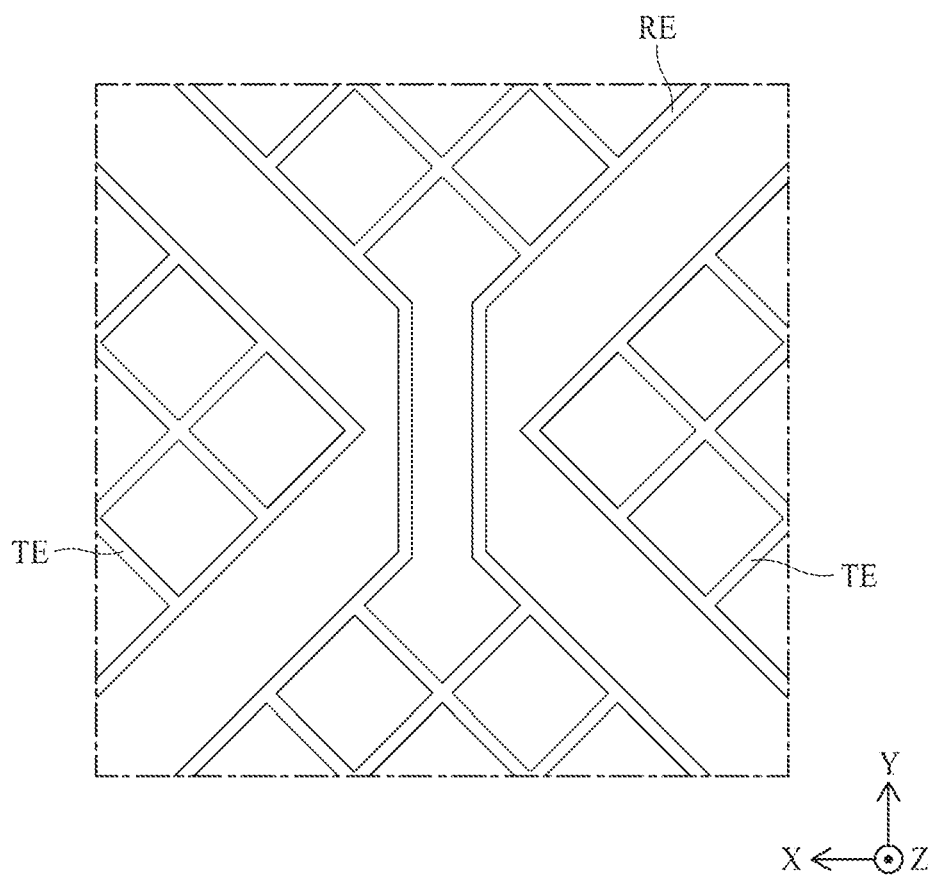
FIG. 7B is a plan view illustrating first and second touch electrodes in FIG. 6.

FIG. 5 is a plan view illustrating first and second touch electrodes, bridge electrode, and first and second touch lines of a display device with integrated touch screen according to an embodiment of the present disclosure. FIG. 6 is an enlarged view illustrating in detail an example of a region A of FIG. 5. FIG. 7A is a plan view illustrating bridge electrodes and dummy electrodes in FIG. 6. FIG. 7B is a plan view illustrating first and second touch electrodes in FIG. 6.

Referring to FIGS. 5, 6, 7A, and 7B, a plurality of first touch electrodes TE may be arranged in a first direction (e.g., an X-axis direction), and a plurality of second touch electrodes RE may be arranged in a second direction (e.g., a Y-axis direction). The first direction (the X-axis direction) may be a direction parallel to the scan lines S1 to Sn, and the second direction (the Y-axis direction) may be a direction parallel to the data lines D1 to Dm. Alternatively, the first direction (the X-axis direction) may be a direction parallel to the data lines D1 to Dm, and the second direction (the Y-axis direction) may be a direction parallel to the scan lines S1 to Sn.

In order to prevent the first touch electrodes TE and the second touch electrodes RE from being short-circuited in intersection areas therebetween, the first touch electrodes TE which are adjacent to each other in the first direction (the X-axis direction) may be electrically connected to one another through respective bridge electrodes BE. That is, as shown in FIG. 6, the bridge electrodes BE may be connected to adjacent first touch electrodes TE through a plurality of first contact holes CNT1 and may intersect a corresponding second touch electrode RE. A mutual capacitance corresponding to a touch sensor may be generated in an intersection area of each of the first touch electrodes TE and a corresponding second touch electrode RE.

Each of first touch electrodes TE connected to each other in the first direction (the X-axis direction) may be spaced apart from and electrically insulated from first touch electrodes TE adjacent thereto in the second direction (the Y-axis direction). That is, a row of first touch electrodes TE that are connected to each other along the first direction may be physical and electrically separated from an adjacent row of first touch electrodes TE. Similarly, each of second touch electrodes RE connected to each other in the second direction (the Y-axis direction) may be spaced apart from and electrically insulated from second touch electrodes RE adjacent thereto in the first direction (the X-axis direction).

A first touch electrode TE, disposed at one side end among a line or row of first touch electrodes TE connected to each other in the first direction (the X-axis direction), may be connected to a first touch line TL. The first touch line TL may be connected to the first touch driver 181 through a pad TP. Therefore, the first touch electrodes TE connected to each other in the first direction (the X-axis direction) may receive a touch driving signal from the first touch driver 181 through the first touch line TL.

A second touch electrode RE, disposed in one side end among a line or column of the second touch electrodes RE connected to each other in the second direction (the Y-axis direction), may be connected to a second touch line RL. The second touch line RL may be connected to the second touch driver 182 through the pad RP. Therefore, the second touch driver 182 may receive charging variations of touch sensors of the second touch electrodes RE connected to each other in the second direction (the Y-axis direction).

The bridge electrodes BE may be disposed on a layer which differs from a layer on which the first and second touch electrodes TE and RE are disposed. The first and second touch electrodes TE and RE may be disposed on the same layer, and the bridge electrode BE may be disposed on the same layer as a plurality of dummy electrodes DE.

The bridge electrodes BE have a bended structure having a bent or curved shape, for example, such as "/\", "\/", "<" or ">" as well as a bar structure having a straight shape, for example, such as "-" as shown in FIG. 6, but the embodiments of the present disclosure are not limited thereto. The bridge electrodes BE are not overlapped with the pixel P. Therefore, when the bridge electrodes BE have the bended structure, the bridge electrodes BE may be overlapped with a left first touch electrode TE, a second touch electrode RE, and a right first touch electrode TE in FIG. 6. Also, when the bridge electrodes BE have the bended structure, the bridge electrodes BE may be formed as a mesh type.

The bridge electrodes BE may be spaced apart from the dummy electrodes DE. Therefore, each of the dummy electrodes DE may be electrically insulated from the bridge electrodes BE. Also, the dummy electrodes DE may be spaced apart and electrically insulated from one another. Furthermore, each of the bridge electrodes BE may be electrically connected to one of the first and second touch electrodes TE and RE, but each of the dummy electrodes DE may be electrically insulated from the first and second touch electrodes TE and RE. That is, each of the dummy electrodes DE may be a floating electrode which is not electrically connected to any electrode.

Moreover, the dummy electrodes DE may be provided to overlap the first and second touch electrodes TE and RE. The term "overlap" is used herein in the broadest sense and it includes to underlay, underlie, overlay, overlie, either partially or fully, and also that two or more elements are arranged in an overlapping manner, without otherwise limiting a positional relationship between the two or more elements. For example, a first element may overlap a second element even in a case where the second element is positioned above the first element. The dummy electrodes DE may be disposed in a layer beneath the layer in which the first and second touch electrodes TE and RE are disposed, and the first and second electrodes TE and RE may be aligned with the underlying dummy electrodes DE, with the first and second electrodes TE and RE having sizes and shapes that overlap the underlying dummy electrodes DE. Therefore, the dummy electrodes DE may be hidden by the first and second touch electrodes TE and RE, and thus, are not illustrated in the plan view of FIG. 6.

Each of the pixels P may be provided in a pentile structure including one red subpixel R, two green subpixels G, and one blue subpixel B, but is not limited thereto. If each of the pixels P is provided in the pentile structure, the red subpixel R, the green subpixels G, and the blue subpixel B may be provided in an octagonally planar shape, as shown for example in FIG. 6. In this case, a size of the blue subpixel B may be largest, and a size of each of the green subpixels G may be smallest.

As described above, according to the present embodiment, since the dummy electrodes DE are provided on the same layer as the bridge electrodes BE, the bridge electrodes BE are prevented from being over-etched by the dummy electrodes DE. That is, the dummy electrodes DE may be disposed adjacent to the bridge electrodes BE so as to prevent the bridge electrodes BE from being over-etched. For example, by positioning the dummy electrodes DE adjacent to the bridge electrodes BE, the dummy electrodes DE will interact with the etching process to reduce or eliminate a potential for an over-etching condition of the bridge electrodes BE during the etching process. Therefore, according to the present embodiment, in a case where each of the bridge electrodes BE is provided in a multi-layer structure including a plurality of electrodes, a side surface of one of the plurality of electrodes is not over-etched with respect to another electrode in the multi-layer structure, and thus, the bridge electrode BE is not provided in a reverse taper shape. As a result, according to the present embodiment, an opening which is a region uncovered by an insulation layer is not provided, and thus, the first touch electrode or the second touch electrode is prevented from being short-circuited with the bridge electrode BE through the opening.

Figure 8:
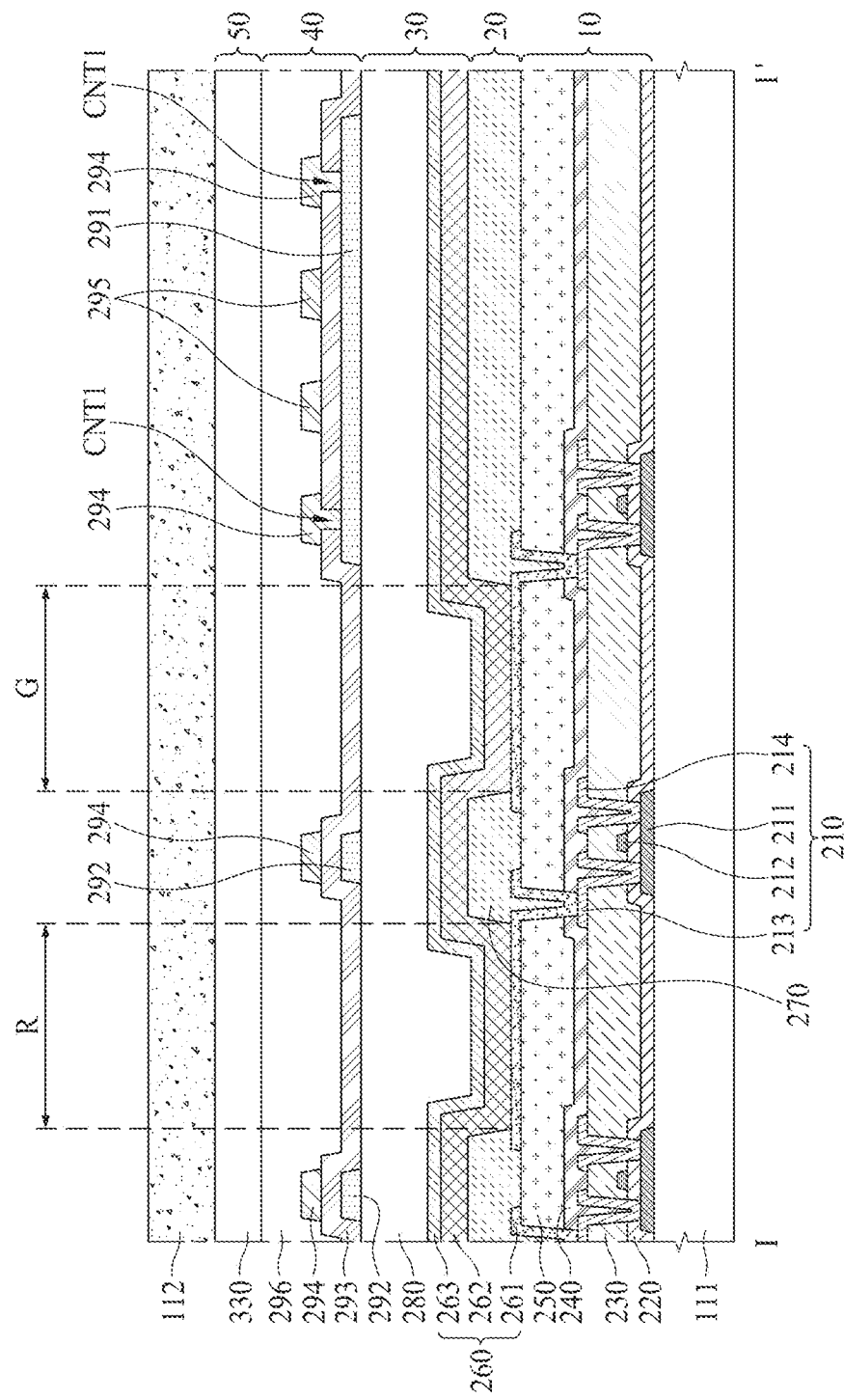
FIG. 8 is a cross-sectional view illustrating an example taken along line I-I' of FIG. 6.

FIG. 8 is a cross-sectional view illustrating an example taken along line I-I' of FIG. 6.

Referring to FIG. 8, a TFT layer 10 may be formed on a first substrate 111. The TFT layer 10 may include a plurality of TFTs 210, a gate insulation layer 220, an interlayer insulation layer 230, a passivation layer 240, and a planarization layer 250.

A buffer layer may be formed on one surface of the first substrate 111. The buffer layer may be formed on the one surface of the first substrate 111, for protecting the TFTs 210 and a plurality of organic light emitting devices 260 from water penetrating through the first substrate 111, which may be vulnerable to penetration of water. The one surface of the first substrate 111 may be a surface facing the second substrate 112. The buffer layer may be formed of a plurality of inorganic layers which are alternately stacked. For example, the buffer layer may be formed of a multilayer where one or more inorganic layers of silicon oxide ($SiO_x$), silicon nitride ($SiN_x$), and SiON are alternately stacked. The buffer layer may be omitted.

The TFTs 210 may be formed on the buffer layer. The TFTs 210 may each include an active layer 211, a gate electrode 212, a source electrode 213, and a drain electrode 214. In FIG. 8, the TFTs 210 are exemplarily illustrated as being formed as a top gate type where the gate electrode 212 is disposed on the active layer 211, but is not limited thereto. That is, the TFTs 210 may be formed as a bottom gate type where the gate electrode 212 is disposed under the active layer 211 or a double gate type where the gate electrode 212 is disposed both on and under the active layer 211.

The active layer 211 may be formed on the buffer layer. The active layer 211 may be formed of a silicon-based semiconductor material, an oxide-based semiconductor material, and/or the like. A light blocking layer (not shown) for blocking external light incident on the active layer 211 may be formed between the buffer layer and the active layer 211.

The gate insulation layer 220 may be formed on the active layer 211. The gate insulation layer 220 may be formed of an inorganic layer, and for example, may be formed of SiOx, SiNx, or a multilayer thereof.

The gate electrode 212 and a gate line may be formed on the gate insulation layer 220. The gate electrode 212 and the gate line may each be formed of a single layer or a multilayer which includes one of molybdenum (Mo), aluminum (Al), chromium (Cr), gold (Au), titanium (Ti), nickel (Ni), neodymium (Nd), and copper (Cu), or an alloy thereof.

The interlayer insulation layer 230 may be formed on the gate electrode 212 and the gate line. The interlayer insulation layer 230 may be formed of an inorganic layer, and for example, may be formed of SiOx, SiNx, or a multilayer thereof.

The source electrode 213, the drain electrode 214, and a data line may be formed on the interlayer insulation layer 230. Each of the source electrode 213 and the drain electrode 214 may be connected to the active layer 211 through a contact hole which passes through the gate insulation layer 220 and the interlayer insulation layer 230. The source electrode 213, the drain electrode 214, and the data line may each be formed of a single layer or a multilayer which includes one of Mo, Al, Cr, Au, Ti, Ni, Nd, and Cu, or an alloy thereof.

The passivation layer 240 for insulating the TFT 220 may be formed on the source electrode 213, the drain electrode 214, and the data line. The passivation layer 240 may be formed of an inorganic layer, and for example, may be formed of SiOx, SiNx, or a multilayer thereof.

The planarization layer 250 for planarizing a step height caused by the TFT 210 may be formed on the passivation layer 240. The planarization layer 250 may be formed of an organic layer such as acryl resin, epoxy resin, phenolic resin, polyamide resin, polyimide resin, or the like.

The light emitting device layer 20 may be formed on the TFT layer 10. The light emitting device layer 20 may include the organic light emitting devices 260 and a bank 270.

The organic light emitting devices 260 and the bank 270 may be formed on the planarization layer 250. The organic light emitting devices 260 may each include a first electrode 261, an organic light emitting layer 262, and a second electrode 263. The first electrode 261 may be an anode electrode, and the second electrode 263 may be a cathode electrode.

The first electrode 261 may be formed on the planarization layer 250. The first electrode 261 may be connected to the source electrode 213 of the TFT 210 through a contact hole which passes through the passivation layer 240 and the planarization layer 250. The first electrode 261 may be formed of a metal material, which is high in reflectivity, such as a stacked structure (Ti/Al/Ti) of Al and Ti, a stacked structure (ITO/Al/ITO) of Al and ITO, an APC alloy, or a stacked structure (ITO/APC/ITO) of an APC alloy and ITO. The APC alloy may be an alloy of Ag, palladium (Pd), and Cu.

The bank 270 may be formed on the planarization layer 250 to divide the first electrode 261, for acting as a pixel defining layer which defines a plurality of pixels P. The bank 270 may be formed to cover an edge of the first electrode 261. At least one of the dummy electrode 292 and the bridge electrode 291 may be overlapped with at least a part of the bank 270.

Each of the pixels P may denote an area where the first electrode 261 corresponding to an anode electrode, the organic light emitting layer 262, and the second electrode 263 corresponding to a cathode electrode are sequentially stacked, a hole from the first electrode 261 and an electron from the second electrode 263 are combined with each other in the organic light emitting layer 262 to emit light.

The organic light emitting layer 262 may be formed on the first electrode 261 and the bank 270. The organic light emitting layer 262 may be a common layer which is formed in the pixels P in common, and may be a white light emitting layer which emits white light. In this case, the organic light emitting layer 262 may be formed in a tandem structure including two or more stacks. Each of the stacks may include a hole transporting layer, at least one light emitting layer, and an electron transporting layer.

Moreover, a charge generating layer may be formed between the stacks. The charge generating layer may include an n-type charge generating layer, disposed adjacent to a lower stack, and a p-type charge generating layer which is formed on the n-type charge generating layer and is disposed adjacent to an upper stack. The n-type charge generating layer may inject an electron into the lower stack, and the p-type charge generating layer may inject a hole into the upper stack. The n-type charge generating layer may be formed of an organic layer where alkali metal, such as lithium (Li), sodium (Na), potassium (K), or cesium (Cs), or alkali earth metal such as magnesium (Mg), strontium (Sr), barium (Ba), or radium (Ra) is doped on an organic host material having an ability to transport electrons. The p-type charge generating layer may be an organic layer where a dopant is doped on an organic material having an ability to transport holes.

The second electrode 263 may be formed on the organic light emitting layer 262. The second electrode 263 may be formed to cover the organic light emitting layer 262. The second electrode 263 may be a common layer which is formed in the plurality of pixels P in common.

The second electrode 263 may be formed of a transparent conductive material (or TCO), such as indium tin oxide (ITO) or indium zinc oxide (IZO) capable of transmitting light, or a semi-transmissive conductive material such as Mg, Ag, or an alloy of Mg and Ag. If the second electrode 263 is formed of a semi-transmissive conductive material, emission efficiency may be enhanced by a micro-cavity. A capping layer may be formed on the second electrode 263.

The encapsulation layer 30 may be formed on the light emitting device layer 20. The encapsulation layer 30 may include an encapsulation film 280.

The encapsulation film 280 may be formed on the second electrode 263. The encapsulation film 280 prevents oxygen or water from penetrating into the organic light emitting layer 262 and the second electrode 263. To this end, the encapsulation film 280 may include at least one inorganic film. The inorganic film may be formed of silicon nitride, aluminum nitride, zirconium nitride, titanium nitride, hafnium nitride, tantalum nitride, silicon oxide, aluminum oxide, titanium oxide, and/or the like.

Moreover, the encapsulation film 280 may further include at least one organic film. The organic film may be formed to have a sufficient thickness, for preventing particles from penetrating into the organic light emitting layer 262 and the second electrode 263 via the encapsulation film 280.

For example, the encapsulation film 280 may include a first inorganic film on the second electrode 263, a first organic film on the first inorganic film, and a second inorganic film on the first organic film. Also, the encapsulation film 280 may further include a third inorganic film or a second organic film on the second inorganic film to maintain a distance between bridge electrodes 291 or touch electrodes 294, 295 of the touch sensing layer 40 and the second electrode 263 as much as at least 5 μm. In this case, parasitic capacitances between bridge electrodes 291 or touch electrodes 294, 295 of the touch sensing layer 40 and the second electrode 263 may be reduced. Therefore, the embodiments of the present disclosure may prevent the second electrode 263 from being affected by the coupling between bridge electrodes 291 or touch electrodes 294, 295 of the touch sensing layer 40 due to the parasitic capacitances.

The touch sensing layer 40 may be formed on the encapsulation layer 30. The touch sensing layer 40 may include a plurality of bridge electrodes 291, a plurality of dummy electrodes 292, an insulation layer 293, a plurality of first touch electrodes 294, and a plurality of second touch electrodes 295. In some embodiments, the touch sensing layer 40 may further include a touch buffer layer formed on the encapsulation film 280, in this case, the plurality of bridge electrodes 291, the plurality of dummy electrodes 292, and the insulation layer 293 may be formed on the touch buffer layer.

The bridge electrodes 291 and the dummy electrodes 292 may be disposed on the encapsulation film 280. That is, the bridge electrodes 291 and the dummy electrodes 292 may be disposed on the same layer. The bridge electrodes 291 may be spaced apart and electrically insulated from the dummy electrodes 292. Each of the dummy electrodes 292 may be a floating electrode which is not electrically connected to any other electrode.

Each of the bridge electrodes 291 and the dummy electrodes 292 may be formed in a multi-layer structure including a plurality of electrodes. For example, each of the bridge electrodes 291 and the dummy electrodes 292 may be formed in a three-layer structure of Ti/Al/Ti. The bridge electrodes 291 and the dummy electrodes 292 may be formed to overlap at least part of the bank 270, for preventing an opening region of each of the pixels P from being reduced. For example, the bank 270 may correspond to a non-light-emitting region, e.g., where the first electrode 261 is spaced apart from the organic light emitting layer 262 by the bank 270, while the openings of the pixels P correspond to the regions between banks 270 where light is emitted. Thus, by forming the bridge electrodes 291 and dummy electrodes 292 over the bank 270, the opening region of the pixels P is not reduced due to the presence of the bridge electrodes 291 and dummy electrodes 292.

The insulation layer 293 may be formed on the bridge electrodes 291 and the dummy electrodes 292. First contact holes CNT1 which expose each of the bridge electrodes 291 may be formed in the insulation layer 293. The insulation layer 293 may be formed of an inorganic layer, and for example, may be formed of SiOx, SiNx, or a multilayer thereof.

The first and second touch electrodes 294 and 295 may be formed on the insulation layer 293. That is, the first and second touch electrodes 294 and 295 may be formed on the same layer. The first and second touch electrodes 294 and 295 may be spaced apart and electrically insulated from each other. Each of the first touch electrodes 294 may be connected to a corresponding bridge electrode 291 through a first contact hole CNT1. Therefore, the first touch electrodes 294 may be connected to each other by the bridge electrodes 291 in an intersection area of the first and second touch electrodes 294 and 295, and thus, the first and second touch electrodes 294 and 295 are not short-circuited with each other.

Each of the first and second touch electrodes 294 and 295 may be formed in a multi-layer structure including a plurality of electrodes. For example, each of the first and second touch electrodes 294 and 295 may be formed in a three-layer structure of Ti/Al/Ti. The first and second touch electrodes 294 and 295 may be formed to overlap at least a part of the bank 270, for preventing the opening region of each of the pixels P from being reduced.

A color filter layer may be formed on the insulation layer 293 and the first and second touch electrodes 294 and 295. The color filter layer may include a plurality of color filters, disposed to overlap a pixel area, and a black matrix disposed to overlap the bank 270. In a case where the organic light emitting layer 262 includes a plurality of organic light emitting layers which emit red, green, and blue lights, the color filter layer may be omitted.

An overcoat layer 296 for planarizing a step height caused by the bridge electrodes 291, the dummy electrodes 292, and the first and second touch electrodes 294 and 295 may be formed on the first and second touch electrodes 294 and 295.

An adhesive layer 50 may be formed on the overcoat layer 296. The adhesive layer 50 may include an adhesive material 330 and may attach the second substrate 112 on the first substrate 111 on which the TFT layer 10, the light emitting device layer 20, the encapsulation layer 30, and the touch sensing layer 40 are provided. The adhesive layer 50 may be an OCR layer, an OCA film, or the like.

The second substrate 112 may act as a cover substrate or a cover window, which covers the first substrate 111. The second substrate 112 may be a plastic film, a glass substrate, an encapsulation film (a protective film), or the like.

As described above, according to the present embodiment, since the dummy electrodes 292 are provided on the same layer as the bridge electrodes 291, the bridge electrodes 291 are prevented from being over-etched by the dummy electrodes 292. That is, the dummy electrodes 292 may be disposed adjacent to the bridge electrodes 291 so as to prevent the bridge electrodes 291 from being over-etched. Therefore, according to the present embodiment, in a case where each of the bridge electrodes 291 is provided in a multi-layer structure including a plurality of electrodes, a side surface of one of the plurality of electrodes is not over-etched by another electrode, and thus, is not provided in a reverse taper shape. As a result, according to the present embodiment, the side surface of the plurality of electrodes may be provided in a positive taper shape, and an opening which is a region uncovered by the insulation layer 293 is not provided, and thus, the first touch electrode 294 or the second touch electrode 295 is prevented from being short-circuited with the bridge electrode 291 through the opening. As used herein, the term "positive taper shape" refers to a tapered shape which is substantially vertical or extends outwardly, for example, from a side of the plurality of electrodes. This is in contrast to the reverse taper shape (or "negative taper shape") of the bridge electrodes shown in FIG. 1, in which a side surface of the second bridge electrode BE2 extends inwardly due to over-etching.

Figure 9:
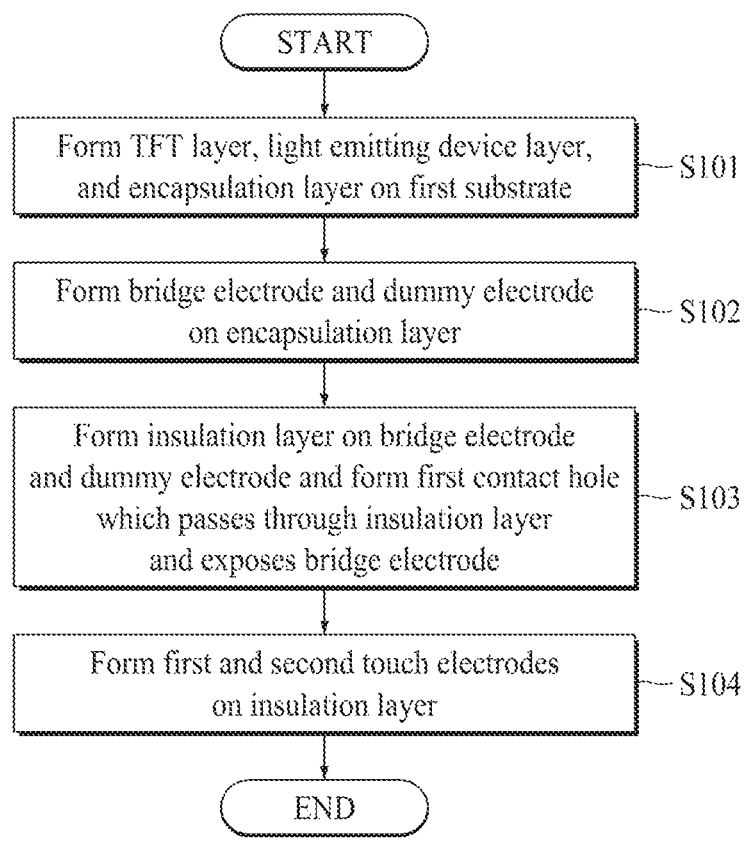
FIG. 9 is a flowchart illustrating a method of manufacturing a display device with integrated touch screen according to an embodiment of the present disclosure.

FIG. 9 is a flowchart illustrating a method of manufacturing a display device with integrated touch screen according to an embodiment of the present disclosure. FIGS. 10A to 10D are cross-sectional views for describing a method of manufacturing a display device with integrated touch screen according to an embodiment of the present disclosure.

Hereinafter, a method of manufacturing a display device with integrated touch screen according to an embodiment of the present disclosure will be described in detail with reference to FIGS. 9 and 10A to 10D. Each of the steps S101 to S104 shown in the flowchart of FIG. 9 may contain multiple steps and sub-steps.

First, at step S101 of FIG. 9, and with reference to FIG. 10A, a TFT layer 10, a light emitting device 20, and an encapsulation layer 30 may be formed on a first substrate 111.

In detail, a buffer layer may be formed on the first substrate 111 before forming a TFT 210. The buffer layer is for protecting the TFT 210 and an organic light emitting device 260 from water penetrating through the first substrate 111 vulnerable to penetration of water and may be formed of a plurality of inorganic layers which are alternately stacked. For example, the buffer layer may be formed of a multilayer where one or more inorganic layers of SiOx, SiNx, and SiON are alternately stacked. The buffer layer may be formed by a chemical vapor deposition (CVD) process.

Subsequently, an active layer 211 of the TFT 210 may be formed on the buffer layer. In detail, an active metal layer may be formed on a whole surface of the buffer layer by using a sputtering process, a metal organic chemical vapor deposition (MOCVD) process, and/or the like. Subsequently, the active layer 211 may be formed by patterning the active metal layer through a mask process using a photoresist pattern. The active layer 211 may be formed of a silicon-based semiconductor material or an oxide-based semiconductor material.

Subsequently, a gate insulation layer 220 may be formed on the active layer 211. The gate insulation layer 220 may be formed of an inorganic layer, and for example, may be formed of SiOx, SiNx, or a multilayer thereof.

Subsequently, a gate electrode 212 of the TFT 210 may be formed on the gate insulation layer 220. In detail, a first metal layer may be formed on a whole surface of the gate insulation layer 220 by using a sputtering process, an MOCVD process, and/or the like. Subsequently, the gate electrode 212 may be formed by patterning the first metal layer through a mask process using a photoresist pattern. The gate electrode 212 may be formed of a single layer or a multilayer which includes one of Mo, Al, Cr, Au, Ti, Ni, Nd, and Cu, or an alloy thereof.

Subsequently, an interlayer insulation layer 230 may be formed on the gate electrode 212. The interlayer insulation layer 230 may be formed of an inorganic layer, and for example, may be formed of SiOx, SiNx, or a multilayer thereof.

Subsequently, a plurality of contact holes which pass through the gate insulation layer 220 and the interlayer insulation layer 230 and expose the active layer 211 may be formed.

Subsequently, a source electrode 213 and a drain electrode 214 included in the TFT 210 may be formed on the interlayer insulation layer 230. In detail, a second metal layer may be formed on a whole surface of the interlayer insulation layer 230 by using a sputtering process, an MOCVD process, and/or the like. Subsequently, the source electrode 213 and the drain electrode 214 may be formed by patterning the second metal layer through a mask process using a photoresist pattern. The source electrode 213 and the drain electrode 214 may be connected to the active layer 211 through the contact holes which pass through the gate insulation layer 220 and the interlayer insulation layer 230. The source electrode 213 and the drain electrode 214 may each be formed of a single layer or a multilayer which includes one of Mo, Al, Cr, Au, Ti, Ni, Nd, and Cu, or an alloy thereof.

Subsequently, a passivation layer 240 may be formed on the source electrode 213 and the drain electrode 214 of the TFT 210. The passivation layer 240 may be formed of an inorganic layer, and for example, may be formed of SiOx, SiNx, or a multilayer thereof. The passivation layer 240 may be formed by a CVD process.

Subsequently, a planarization layer 250 for planarizing a step height caused by the TFT 210 may be formed on the passivation layer 240. The planarization layer 250 may be formed of an organic layer such as acryl resin, epoxy resin, phenolic resin, polyamide resin, polyimide resin, and/or the like.

Subsequently, a first electrode 261 included in the organic light emitting device 260 may be formed on the planarization layer 250. In detail, a third metal layer may be formed on a whole surface of the planarization layer 250 by using a sputtering process, an MOCVD process, and/or the like. Subsequently, the first electrode 261 may be formed by patterning the third metal layer through a mask process using a photoresist pattern. The first electrode 261 may be connected to the source electrode 213 of the TFT 210 through a contact hole which passes through the passivation layer 240 and the planarization layer 250. The first electrode 261 may be formed of a metal material, which is high in reflectivity, such as a stacked structure (Ti/Al/Ti) of Al and Ti, a stacked structure (ITO/Al/ITO) of Al and ITO, an APC alloy, or a stacked structure (ITO/APC/ITO) of an APC alloy and ITO.

Subsequently, a bank 270 may be formed on the planarization layer 250 to cover an edge of the first electrode 261, for dividing a plurality of pixels P. The bank 270 may be formed of an organic layer such as acryl resin, epoxy resin, phenolic resin, polyamide resin, polyimide resin, and/or the like.

Subsequently, an organic light emitting layer 262 may be formed on the first electrode 261 and the bank 270 through a deposition process or a solution process. The organic light emitting layer 262 may be a common layer which is formed in the pixels P in common. In this case, the organic light emitting layer 262 may be a white light emitting layer which emits white light.

If the organic light emitting layer 262 is the white light emitting layer, the organic light emitting layer 262 may be formed in a tandem structure including two or more stacks. Each of the stacks may include a hole transporting layer, at least one light emitting layer, and an electron transporting layer.

Moreover, a charge generating layer may be formed between the stacks. The charge generating layer may include an n-type charge generating layer, disposed adjacent to a lower stack, and a p-type charge generating layer which is formed on the n-type charge generating layer and is disposed adjacent to an upper stack. The n-type charge generating layer may inject an electron into the lower stack, and the p-type charge generating layer may inject a hole into the upper stack. The n-type charge generating layer may be formed of an organic layer where alkali metal, such as lithium (Li), sodium (Na), potassium (K), or cesium (Cs), or alkali earth metal such as magnesium (Mg), strontium (Sr), barium (Ba), or radium (Ra) is doped on an organic host material having an ability to transport electrons. The p-type charge generating layer may be formed by doping a dopant on an organic material having an ability to transport holes.

Subsequently, a second electrode 263 may be formed on the organic light emitting layer 262. The second electrode 263 may be a common layer which is formed in the pixels P in common. The second electrode 263 may be formed of a transparent conductive material (or TCO) such as ITO or IZO capable of transmitting light. The second electrode 263 may be formed through a physical vapor deposition (PVD) process such as a sputtering process and/or the like. A capping layer may be formed on the second electrode 263.

Subsequently, an encapsulation film 280 may be formed on the second electrode 263. The encapsulation film 280 prevents oxygen or water from penetrating into the organic light emitting layer 262 and the second electrode 263. To this end, the encapsulation film 280 may include at least one inorganic film. The inorganic film may be formed of silicon nitride, aluminum nitride, zirconium nitride, titanium nitride, hafnium nitride, tantalum nitride, silicon oxide, aluminum oxide, titanium oxide, and/or the like.

Moreover, the encapsulation film 280 may further include at least one organic film. The organic film may be formed to have a sufficient thickness, for preventing particles from penetrating into the organic light emitting layer 262 and the second electrode 263 via the encapsulation film 280, see S101 of FIG. 9.

Figure 10B:
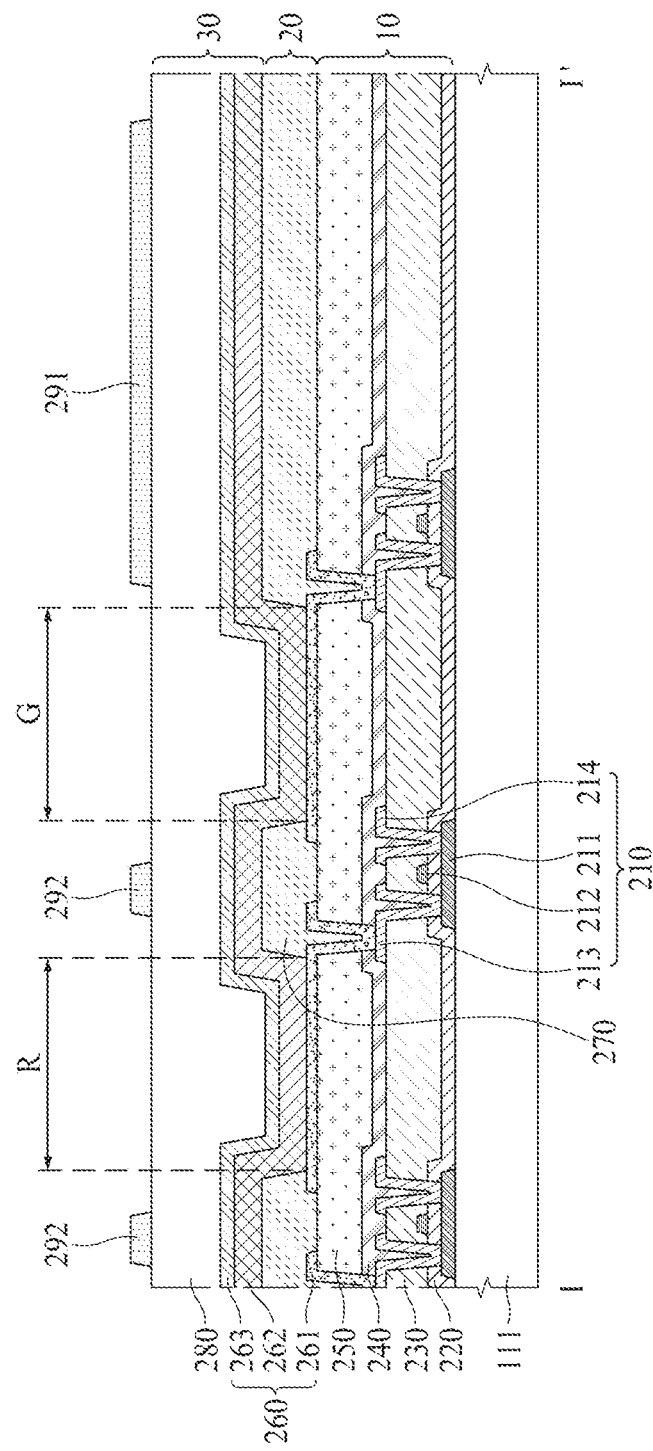

Second, at step S102 of FIG. 9, and with reference to FIG. 10B, a bridge electrode 291 and a dummy electrode 292 of a touch sensing layer 40 may be formed on the encapsulation layer 30.

In detail, a fourth metal layer may be formed on a whole surface of the encapsulation film 280 by using a sputtering process, an MOCVD process, and/or the like. Subsequently, the bridge electrode 291 and the dummy electrode 292 may be formed by patterning the fourth metal layer through a mask process using a photoresist pattern. The bridge electrode 291 and the dummy electrode 292 may be formed in a multi-layer structure including a plurality of electrodes, and for example, may be formed in a three-layer structure of Ti/Al/Ti, see S102 of FIG. 9.

Figure 10C:
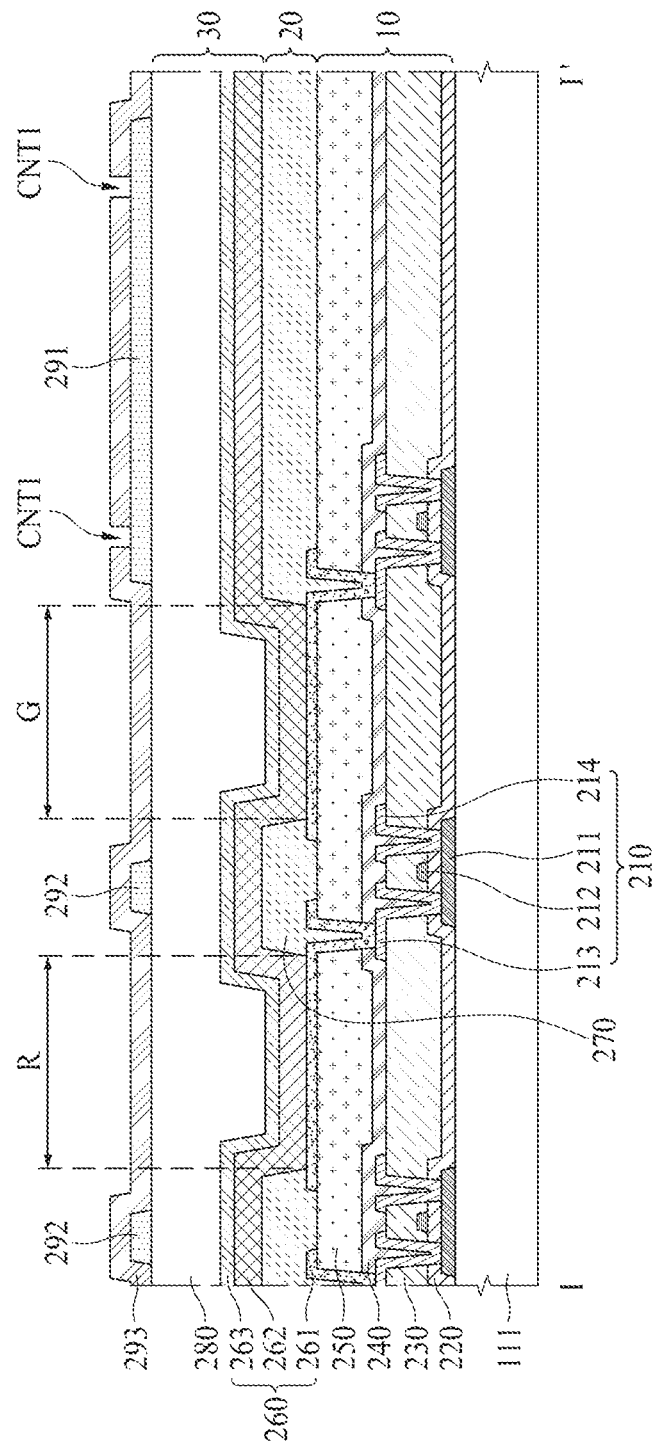

Third, at step S103 of FIG. 9, and with reference to FIG. 10C, an insulation layer 293 covering the bridge electrode 291 and the dummy electrode 292 may be formed, and a plurality of first contact holes CNT1 which pass through the insulation layer 293 and expose the bridge electrode 291 may be formed. The insulation layer 293 may be formed of an inorganic layer, and for example, may be formed of SiOx, SiNx, or a multilayer thereof, see S103 of FIG. 9.

Figure 10D:
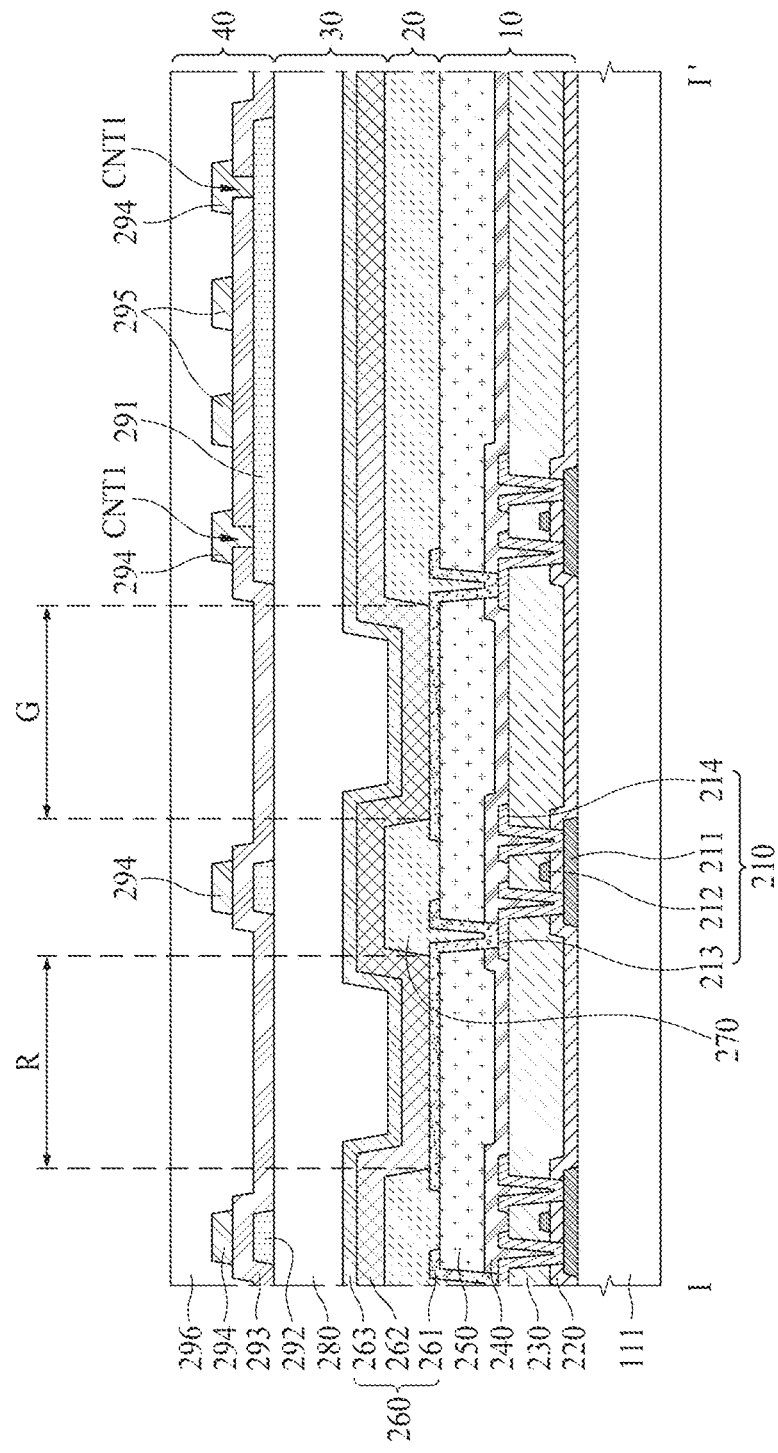

Fourth, at step S104 of FIG. 9, and with reference to FIG. 10D, first and second touch electrodes 294 and 295 may be formed on the insulation layer 293.

In detail, a fifth metal layer may be formed on a whole surface of the insulation layer 293, and in the first contact holes CNT1, by using a sputtering process, an MOCVD process, and/or the like. Subsequently, the first and second touch electrodes 294 and 295 may be formed by patterning the fifth metal layer through a mask process using a photoresist pattern. The first and second touch electrodes 294 and 295 may be connected to the bridge electrode 291 through the first contact holes CNT1 passing through the insulation layer 293. The first and second touch electrodes 294 and 295 may each be formed in a multi-layer structure including a plurality of electrodes, and for example, may be formed in a three-layer structure of Ti/Al/Ti.

A color filter layer may be formed on the insulation layer 293 and the first and second touch electrodes 294 and 295. The color filter layer may include a plurality of color filters, disposed to overlap a pixel area, and a black matrix disposed to overlap the bank 270. In a case where the organic light emitting layer 262 includes a plurality of organic light emitting layers which emit red, green, and blue lights, the color filter layer may be omitted.

Moreover, an overcoat layer 296 for planarizing a step height caused by the bridge electrodes 291, the dummy electrodes 292, and the first and second touch electrodes 294 and 295 may be formed on the first and second touch electrodes 294 and 295, see S104 of FIG. 9.

Subsequently, by using an adhesive layer 50, the first substrate 111 may be attached on the second substrate 112. The adhesive layer 50 may be an OCR layer, an OCA film, or the like.

Figure 11:
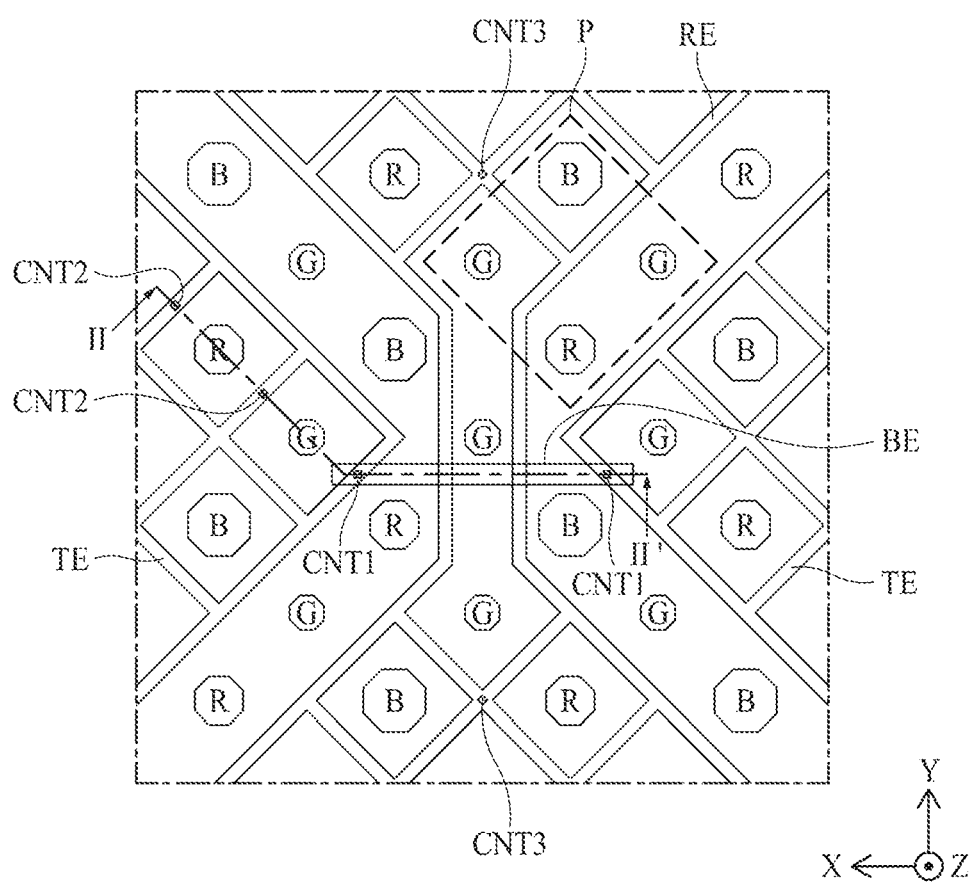
FIG. 11 is an enlarged view illustrating in detail another example of the region A of FIG. 5, in accordance with one or more embodiments of the present disclosure.

FIG. 11 is an enlarged view illustrating in detail another example of the region A of FIG. 5.

Except for that a first touch electrode TE is connected to a dummy electrode DE through one or more second contact holes CNT2 and a second touch electrode RE is connected to a dummy electrode DE through one or more third contact holes CNT3, the enlarged view of FIG. 11 is substantially the same as the description given above with reference to FIG. 6. Thus, further detailed description of FIG. 11 is omitted.

Figure 12:
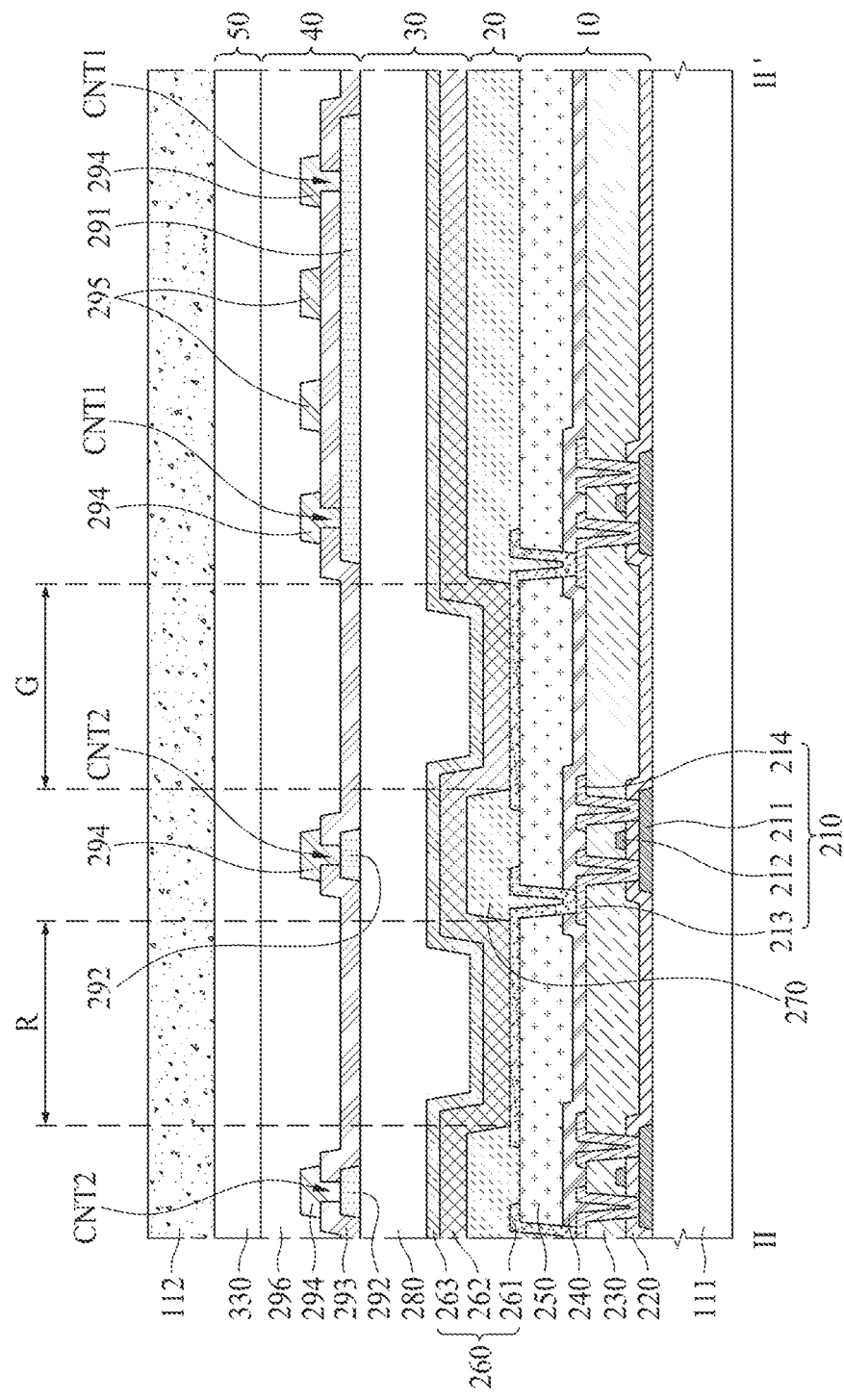
FIG. 12 is a cross-sectional view illustrating an example taken along line II-II' of FIG. 11.

FIG. 12 is a cross-sectional view illustrating an example taken along line II-II' of FIG. 11.

Except for a touch sensing layer 40, the cross-sectional view of FIG. 12 is substantially the same as description given above with reference to FIG. 8. Thus, detailed descriptions of a first substrate 111, a TFT layer 10, a light emitting device layer 20, an encapsulation layer 30, an adhesive layer 50, and a second substrate 112 are omitted.

Referring to FIG. 12, the touch sensing layer 40 may be formed on the encapsulation layer 30. The touch sensing layer 40 may include a plurality of bridge electrodes 291, a plurality of dummy electrodes 292, an insulation layer 293, a plurality of first touch electrodes 294, and a plurality of second touch electrodes 295.

The bridge electrodes 291 and the dummy electrodes 292 may be disposed on the encapsulation film 280. That is, the bridge electrodes 291 and the dummy electrodes 292 may be disposed on the same layer. The bridge electrodes 291 may be spaced apart from the dummy electrodes 292.

Each of the bridge electrodes 291 and the dummy electrodes 292 may be formed in a multi-layer structure including a plurality of electrodes. For example, each of the bridge electrodes 291 and the dummy electrodes 292 may be formed in a three-layer structure of Ti/Al/Ti. The bridge electrodes 291 and the dummy electrodes 292 may be formed to overlap the bank 270, for preventing an opening region of a pixel P from being reduced.

The insulation layer 293 may be formed on the bridge electrodes 291 and the dummy electrodes 292. First contact holes CNT1 which expose each of the bridge electrodes 291 may be formed in the insulation layer 293. The insulation layer 293 may be formed of an inorganic layer, and for example, may be formed of SiOx, SiNx, or a multilayer thereof.

The first and second touch electrodes 294 and 295 may be formed on the insulation layer 293. That is, the first and second touch electrodes 294 and 295 may be formed on the same layer. The first and second touch electrodes 294 and 295 may be spaced apart and electrically insulated from each other.

Each of the first touch electrodes 294 may be connected to a corresponding bridge electrode 291 through a first contact hole CNT1. Therefore, the first touch electrodes 294 may be connected to each other by using the bridge electrodes 291 in an intersection area of the first and second touch electrodes 294 and 295, and thus, the first and second touch electrodes 294 and 295 are not short-circuited with each other.

Each of the first touch electrodes 294 may be connected to a corresponding dummy electrode 292 through one or more second contact holes CNT2. Therefore, since the dummy electrodes 292 are electrically connected to the first touch electrodes 294, a cross-sectional area of each of the first touch electrodes 294 increases. Accordingly, in an embodiment of the present disclosure, a resistance of each of the first touch electrodes 294 is reduced.

Each of the second touch electrodes 295 may be connected to a corresponding dummy electrode 292 through a third contact hole (not shown). Therefore, since the dummy electrodes 292 are electrically connected to the second touch electrodes 295, a cross-sectional area of each of the second touch electrodes 295 increases. Accordingly, in an embodiment of the present disclosure, a resistance of each of the second touch electrodes 295 is reduced.

Each of the first and second touch electrodes 294 and 295 may be formed in a multi-layer structure including a plurality of electrodes. For example, each of the first and second touch electrodes 294 and 295 may be formed in a three-layer structure of Ti/Al/Ti. The first and second touch electrodes 294 and 295 may be formed to overlap the bank 270, for preventing the opening region of the pixel P from being reduced.

A color filter layer may be formed on the insulation layer 293 and the first and second touch electrodes 294 and 295. The color filter layer may include a plurality of color filters, disposed to overlap a pixel or subpixel area, and a black matrix disposed to overlap the bank 270. In a case where the organic light emitting layer 262 includes a plurality of organic light emitting layers which emit red, green, and blue lights, the color filter layer may be omitted.

An overcoat layer 296 for planarizing a step height caused by the bridge electrodes 291, the dummy electrodes 292, and the first and second touch electrodes 294 and 295 may be formed on the first and second touch electrodes 294 and 295.

Figure 13:
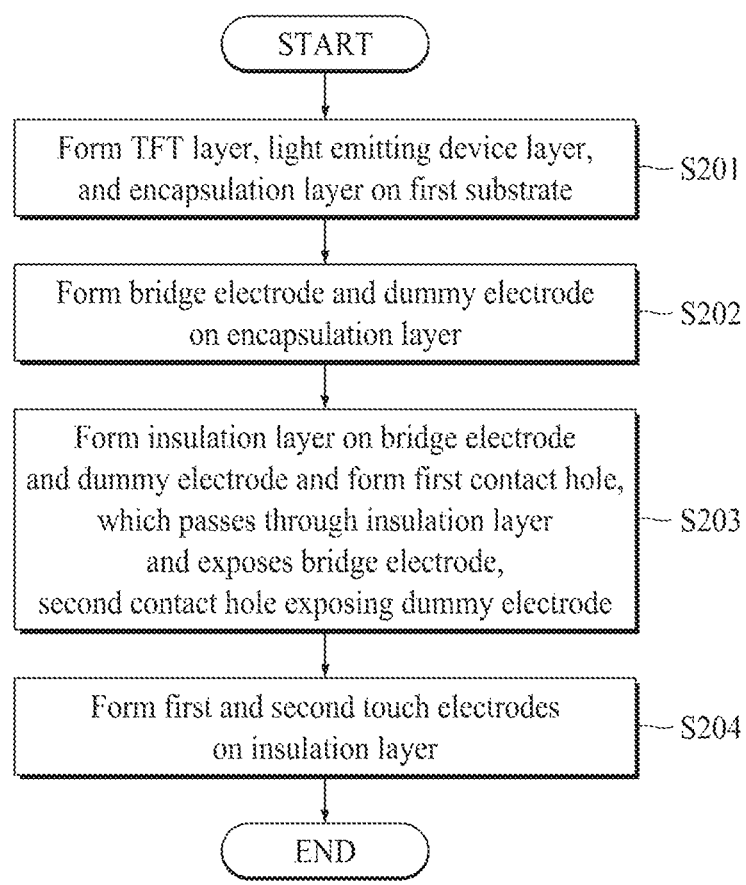
FIG. 13 is a flowchart illustrating a method of manufacturing a display device with integrated touch screen according to another embodiment of the present disclosure.
Figure 14A:
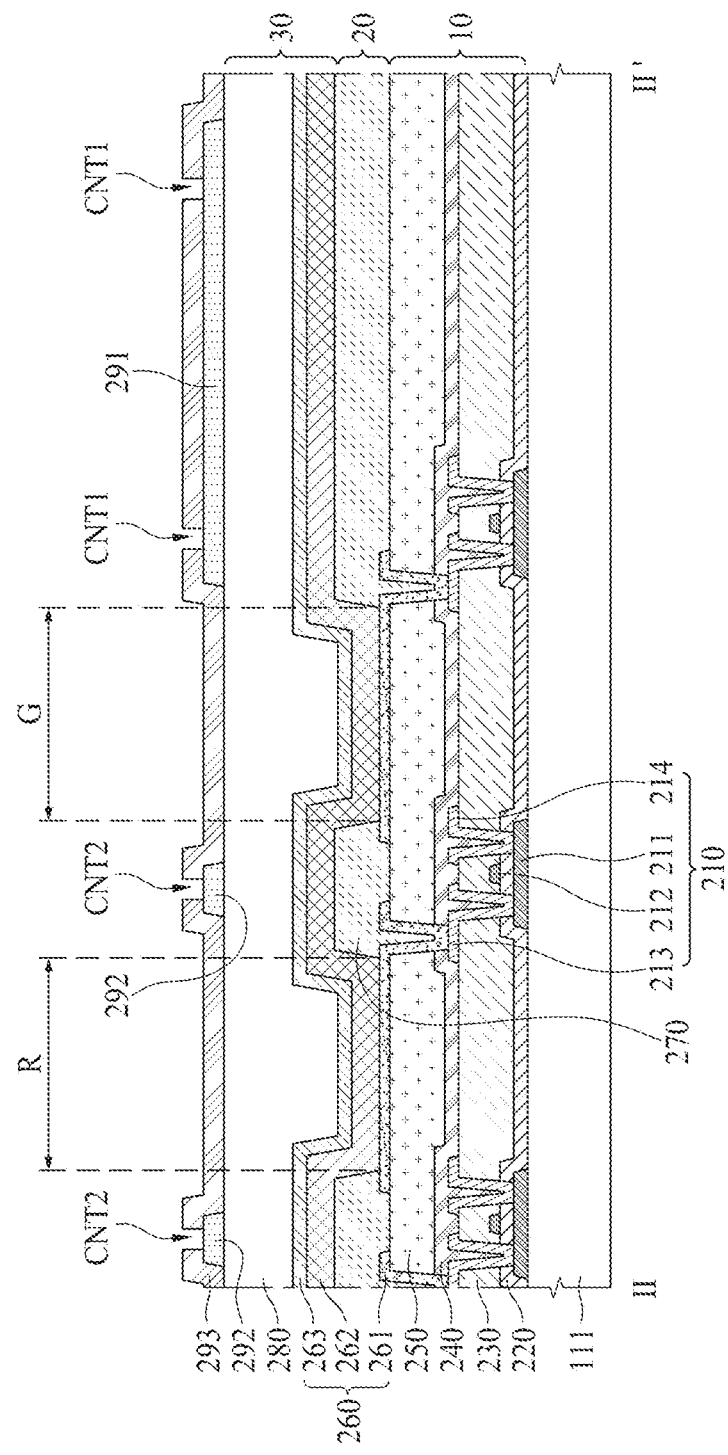

FIG. 13 is a flowchart illustrating a method of manufacturing a display device with integrated touch screen according to another embodiment of the present disclosure. FIGS. 14A and 14B are cross-sectional views for describing a method of manufacturing a display device with integrated touch screen according to another embodiment of the present disclosure. Each of the steps S201 to S204 shown in the flowchart of FIG. 13 may contain multiple steps and substeps.

Hereinafter, a method of manufacturing a display device with integrated touch screen according to another embodiment of the present disclosure will be described in detail with reference to FIGS. 13, 14A, and 14B.

Steps S201 and S202 of FIG. 13 are substantially the same as steps S101 and S102 of FIG. 9, and thus, their detailed descriptions are omitted.

At step S203 of FIG. 13, and with reference to FIG. 14A, an insulation layer 293 covering a bridge electrode 291 and a dummy electrode 292 may be formed, and a first contact hole CNT1 which passes through the insulation layer 293 and exposes the bridge electrode 291, second contact hole CNT2, and third contact holes (not shown) which expose the dummy electrode 292 may be formed. The insulation layer 293 may be formed of an inorganic layer, and for example, may be formed of SiOx, SiNx, or a multilayer thereof, see S203 of FIG. 13.

Subsequently, at step S204 of FIG. 13, and with reference to FIG. 14B, first and second touch electrodes 294 and 295 may be formed on the insulation layer 293.

In detail, a fifth metal layer may be formed on a whole surface of the insulation layer 293, and in the first, second, and third contact holes CNT1 to CNT3, by using a sputtering process, an MOCVD process, and/or the like. Subsequently, the first and second touch electrodes 294 and 295 may be formed by patterning the fifth metal layer through a mask process using a photoresist pattern. The first touch electrode 294 may be connected to the bridge electrode 291 through the first contact hole CNT1 passing through the insulation layer 293. Also, the first touch electrode 294 may be connected to the dummy electrode 292 through the second contact hole CNT2 passing through the insulation layer 293. Also, the second touch electrode 295 may be connected to the dummy electrode 292 through the third contact hole (not shown) passing through the insulation layer 293. The first and second touch electrodes 294 and 295 may each be formed in a multi-layer structure including a plurality of electrodes, and for example, may be formed in a three-layer structure of Ti/Al/Ti.

A color filter layer may be formed on the insulation layer 293 and the first and second touch electrodes 294 and 295. The color filter layer may include a plurality of color filters, disposed to overlap a pixel area or a subpixel area, and a black matrix disposed to overlap a bank 270. In a case where an organic light emitting layer 262 includes a plurality of organic light emitting layers which emit red, green, and blue lights, the color filter layer may be omitted.

Moreover, an overcoat layer 296 for planarizing a step height caused by the bridge electrode 291, the dummy electrode 292, and the first and second touch electrodes 294 and 295 may be formed on the first and second touch electrodes 294 and 295, see S204 of FIG. 13.

Subsequently, by using an adhesive layer 50, a first substrate 111 may be attached on a second substrate 112. The adhesive layer 50 may be an OCR layer, an OCA film, or the like.

As described above, according to the embodiments of the present disclosure, since dummy electrodes are provided adjacent to bridge electrodes on the same layer as the bridge electrodes, the bridge electrodes are prevented from being over-etched by the dummy electrodes. Therefore, according to the embodiments of the present disclosure, in a case where each of the bridge electrodes is provided in a multi-layer structure including a plurality of electrodes, a side surface of one of the plurality of electrodes is not over-etched by another electrode, and thus, is not provided in a reverse taper shape. As a result, according to the embodiments of the present disclosure, an opening which is a region uncovered by an insulation layer is not provided, and thus, a first touch electrode or a second touch electrode is prevented from being short-circuited with a bridge electrode through the opening.

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A display device with integrated touch screen, the display device comprising:
   a substrate;
   first electrodes on the substrate, the first electrodes spaced apart from neighboring first electrodes;
   a bank disposed between neighboring ones of the first electrodes, the bank being on and contacting at feast a part of the first electrodes;
   a light emitting layer on the first electrodes;
   a second electrode on the light emitting layer;
   an encapsulation layer on the second electrode;
   a bridge electrode on the encapsulation layer;
   a dummy electrode disposed on the encapsulation layer at an overlapping location with the bank;
   an insulation layer covering the bridge electrode on the encapsulation layer; and
   a first touch electrode and a second touch electrode on the insulation layer, the first touch electrode electrically connected to the bridge electrode.

2. The display device of claim 1, wherein the dummy electrode is overlapped by the first touch electrode or the second touch electrode.

3. The display device of claim 1, wherein the dummy electrode is a floating electrode.

4. The display device of claim 1, wherein the first touch electrode is connected to the bridge electrode through a first contact hole which passes through the insulation layer and exposes the bridge electrode.

5. The display device of claim 1, wherein the dummy electrode is electrically connected with the first touch electrode.

6. The display device of claim 5, wherein the first touch electrode is connected to the dummy electrode through a second contact hole which passes through the insulation layer and exposes the dummy electrode.

7. The display device of claim 1, wherein the dummy electrode is electrically connected with the second touch electrode.

8. The display device of claim 7, wherein the second touch electrode is connected to the dummy electrode through a third contact hole which passes through the insulation layer and exposes the dummy electrode.

9. The display device of claim 1,
   wherein at least one of the dummy electrode and the bridge electrode is overlapped with at least a part of the bank.

10. The display device of claim 9, wherein the first and second touch electrodes are overlapped with at least a part of the bank.

11. The display device of claim 1, wherein each of the bridge electrode and the dummy electrode has a three-layer structure.

12. The display device of claim 1, wherein the bridge electrode and the dummy electrode are formed of a same material on the encapsulation layer and are substantially co-planar with one another.

13. The display device of claim 1, wherein each of the first touch electrode and the second touch electrode has a three-layer structure, and the first and second touch electrodes are formed of a same material on a same layer.

14. The display device of claim 1, further comprising an overcoat layer on the first and second touch electrodes, the overcoat layer configured to planarize a step height caused by the bridge electrode, the dummy electrode, and the first and second touch electrodes.

15. The display device of claim 1, further comprising a touch buffer layer on the encapsulation layer, wherein the bridge electrode and the dummy electrode are disposed on and directly contacting the touch buffer layer.

16. The display device of claim 1, wherein the bridge electrode has a mesh shape.

17. A display device with integrated touch screen, the display device comprising:
    a substrate;
    first electrodes on the substrate, the first electrodes spaced apart from neighboring first electrodes;
    a bank disposed between respective ones of the first electrodes, the bank being on and contacting at least a part of the first electrodes;
    a light emitting layer on the first electrode;
    a second electrode on the light emitting layer;
    an encapsulation layer on the second electrode;
    a touch buffer layer on the encapsulation layer;
    a bridge electrode having a multi-layer structure on the touch buffer layer at an overlapping location with the bank;
    a dummy electrode on the touch buffer layer at an overlapping location with the bank;
    an insulation layer covering the bridge electrode on the encapsulation layer; and
    a first touch electrode and a second touch electrode on the insulation layer,
    wherein the bridge electrode is electrically connected to the first touch electrode, and a side surface of the bridge electrode is provided in a positive taper shape.

18. The display device of claim 17, wherein the dummy electrode overlaps the first touch electrode or the second touch electrode.

19. The display device of claim 17, wherein the dummy electrode is a floating electrode.

20. The display device of claim 17, wherein the first touch electrode is connected to the bridge electrode through a contact hole which passes through the insulation layer and exposes the bridge electrode.

21. The display device of claim 17, wherein the dummy electrode is electrically connected with the first touch electrode.

22. The display device of claim 21, wherein the first touch electrode is connected to the dummy electrode through a contact hole which passes through the insulation layer and exposes the dummy electrode.

23. The display device of claim 17, wherein the dummy electrode is electrically connected with the second touch electrode.

24. The display device of claim 23, wherein the second touch electrode is connected to the dummy electrode through a contact hole which passes through the insulation layer and exposes the dummy electrode.

25. The display device of claim 17,
    wherein at least one of the dummy electrode and the bridge electrode is overlapped with at least a part of the bank.

26. The display device of claim 25, wherein the first and second touch electrodes are overlapped with at least a part of the bank.

27. The display device of claim 17, wherein each of the bridge electrode and the dummy electrode has a three-layer structure.

28. The display device of claim 17, wherein the bridge electrode and the dummy electrode are formed of a same material on aril the touch buffer layer.

29. The display device of claim 17, wherein the bridge electrode is a mesh type.

30. The display device of claim 1, wherein the dummy electrode is insulated from the bridge electrode.

* * * * *

UNITED STATES PATENT AND TRADEMARK OFFICE
CERTIFICATE OF CORRECTION

Page 1 of 1

PATENT NO. : 10,754,461 B2
APPLICATION NO. : 15/992630
DATED : August 25, 2020
INVENTOR(S) : SangHoon Pak et al.

It is certified that error appears in the above-identified patent and that said Letters Patent is hereby corrected as shown below:

In the Claims

Column 23, Claim 1, Line 14:
"contacting at feast a" should be: --contacting at least a--.

Column 25, Claim 28, Line 6:
"material on aril the touch buffer layer." should be: --material on the touch buffer layer.--.

Signed and Sealed this
Twenty-second Day of December, 2020

Andrei Iancu
*Director of the United States Patent and Trademark Office*